US012681722B2

(12) United States Patent
Boué et al.

(10) Patent No.: US 12,681,722 B2
(45) Date of Patent: Jul. 14, 2026

(54) SOFTWARE DEVELOPMENT PRIORITIZATION USING TRAINED MODEL

(71) Applicant: Microsoft Technology Licensing, LLC, Redmond, WA (US)

(72) Inventors: Laurent Boué, Petah Tikva (IL); Kiran Rama, Bangalore (IN); Ravi Prasad Kondapalli, Bangalore (IN); Sharath Kumar Rangappa, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 223 days.

(21) Appl. No.: 18/627,765

(22) Filed: Apr. 5, 2024

(65) Prior Publication Data

US 2025/0315254 A1 Oct. 9, 2025

(51) Int. Cl.
*G06F 8/77* (2018.01)
(52) U.S. Cl.
CPC ....................................... *G06F 8/77* (2013.01)
(58) Field of Classification Search
None
See application file for complete search history.

(56) References Cited

U.S. PATENT DOCUMENTS

2016/0098662 A1* 4/2016 Voss ................. G06Q 10/06316
705/7.26
2017/0372225 A1* 12/2017 Foresti ................... G06N 20/00

2021/0056146 A1* 2/2021 Pokorny ................... G06F 8/70
2021/0319056 A1* 10/2021 Zhao ..................... G06N 3/0464
2023/0359458 A1* 11/2023 Evans ....................... G06F 8/36
2024/0126678 A1* 4/2024 Blazhiyevskiy .......... G06F 8/70

OTHER PUBLICATIONS

Ali et al., "Role of Requirement Prioritization Technique to Improve the Quality of Highly-Configurable Systems," IEEE, 2020. (Year: 2020).*

(Continued)

*Primary Examiner* — Ryan D. Coyer
(74) *Attorney, Agent, or Firm* — Weaver IP L.L.C.

(57) ABSTRACT

Systems, methods, devices, and computer readable storage media described herein provide techniques for prioritizing software development using a trained model. In an aspect, model features are determined based on analysis of user behavior with respect to a software application. A software development prioritization (SDP) system determines data associated with the model features and utilizes a generative artificial intelligence (AI) model to summarize the model features based on the determined data. The SDP system determines, based on the summaries, a similarity between software development items and the model features and prioritizes one of the software development items over another based on the determined similarities. In a further embodiment, the SDP system causes a software development task corresponding to the prioritized software development item to be performed before another software development task corresponding to a different software development item. In an aspect, model features are determined utilizing a trained machine learning model.

20 Claims, 8 Drawing Sheets

300

302 Receive a first model feature and a second model feature determined based on analysis of user behavior with respect to a software application 304 Determine data associated with the first and second model features 306 Utilize a large language model (LLM) to generate, based on the determined data, a first feature summary for the first model feature and a second feature summary for the second model feature 308 Determine, based on the first and second feature summaries, similarities between a first software development item and the first model feature, a second software development item and the first model feature, the first software development item and the second model feature, and the second software development item and the second model feature 310 Prioritize the first software development item based on the determined similarties

(56)     References Cited

OTHER PUBLICATIONS

Calegario et al., "Exploring the intersection of Generative AI and Software Development," arXiv, 2023. (Year: 2023).*

Soong et al., "Optimizing New User Experience in Online Services," IEEE, 2018. (Year: 2018).*

Sridhara et al., "ChatGPT: A Study on its Utility for Ubiquitous Software Engineering Tasks," arXiv, 2023. (Year: 2023).*

Wang et al., "Machine/Deep Learning for Software Engineering: A Systematic Literature Review," IEEE, 2023. (Year: 2023).*

Bugayenko, et al., "Automatically prioritizing and assigning tasks from code repositories in puzzle driven development", Proceedings of the first international Workshop on designing and running Project-based courses in software Engineering education, May 23, 2022, pp. 722-723.

Christopher Theisen, "Reusing stack traces: automated attack surface approximation", Proceedings of the 38th International Conference on Software Engineering Companion—ACM, May 14, 2016, pp. 859-862.

Extended European search report received for European Application No. 25166952.9, mailed on Aug. 6, 2025, 14 pages.

Noei, et al., "Towards prioritizing user-related issue reports of mobile applications", Empirical Software Engineering, vol. 24, Jan. 29, 2019, pp. 1964-1996.

Communication pursuant to Article 94(3) received for European Application No. 25166952.9, Mailed on Apr. 20, 2026, 14 Pages.

* cited by examiner

200

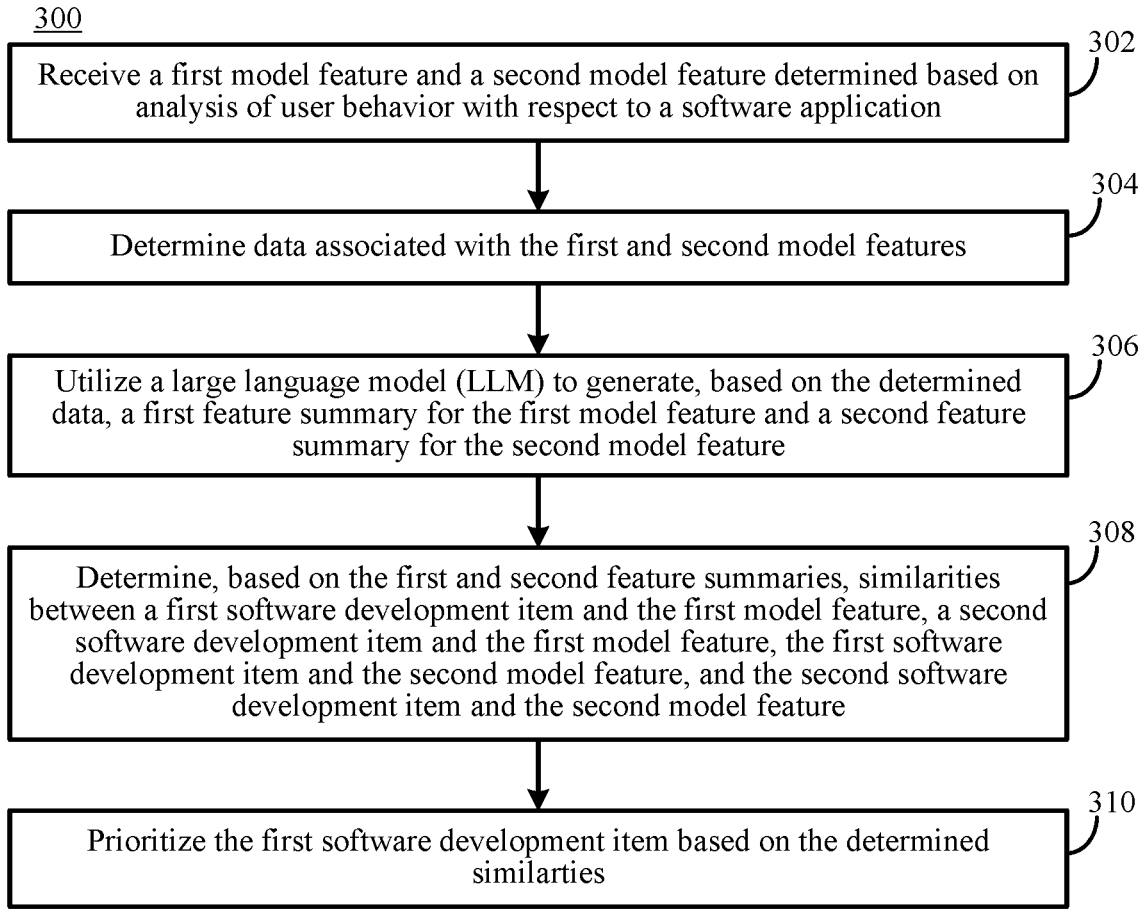

300

302
Receive a first model feature and a second model feature determined based on analysis of user behavior with respect to a software application 304
Determine data associated with the first and second model features 306
Utilize a large language model (LLM) to generate, based on the determined data, a first feature summary for the first model feature and a second feature summary for the second model feature 308
Determine, based on the first and second feature summaries, similarities between a first software development item and the first model feature, a second software development item and the first model feature, the first software development item and the second model feature, and the second software development item and the second model feature 310
Prioritize the first software development item based on the determined similarties

402
Perform a first software development task corresponding to the first software development item prior to a second software development task corresponding to the second software development item

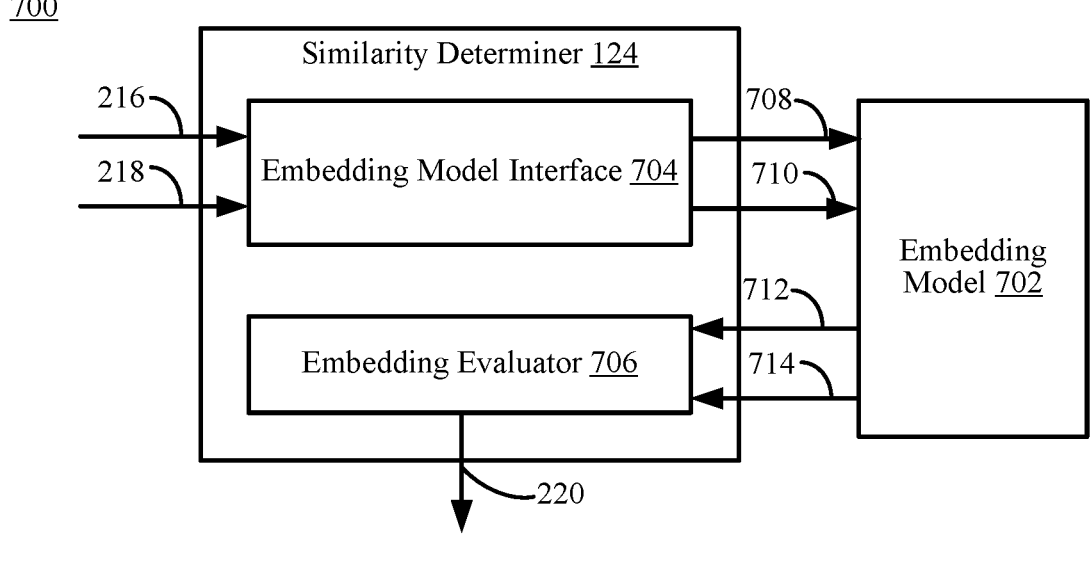

| 802 |
| Provide the first and second software development items and the first and second model features to an embedding model |

| 804 |
| Receive, from the embedding model, development item embeddings describing a context of the first and second software development items and feature embeddings describing a context of the first and second model features |

| 806 |
| Determine similarities between the development item embeddings and the feature embeddings |

Figures 9, 10:
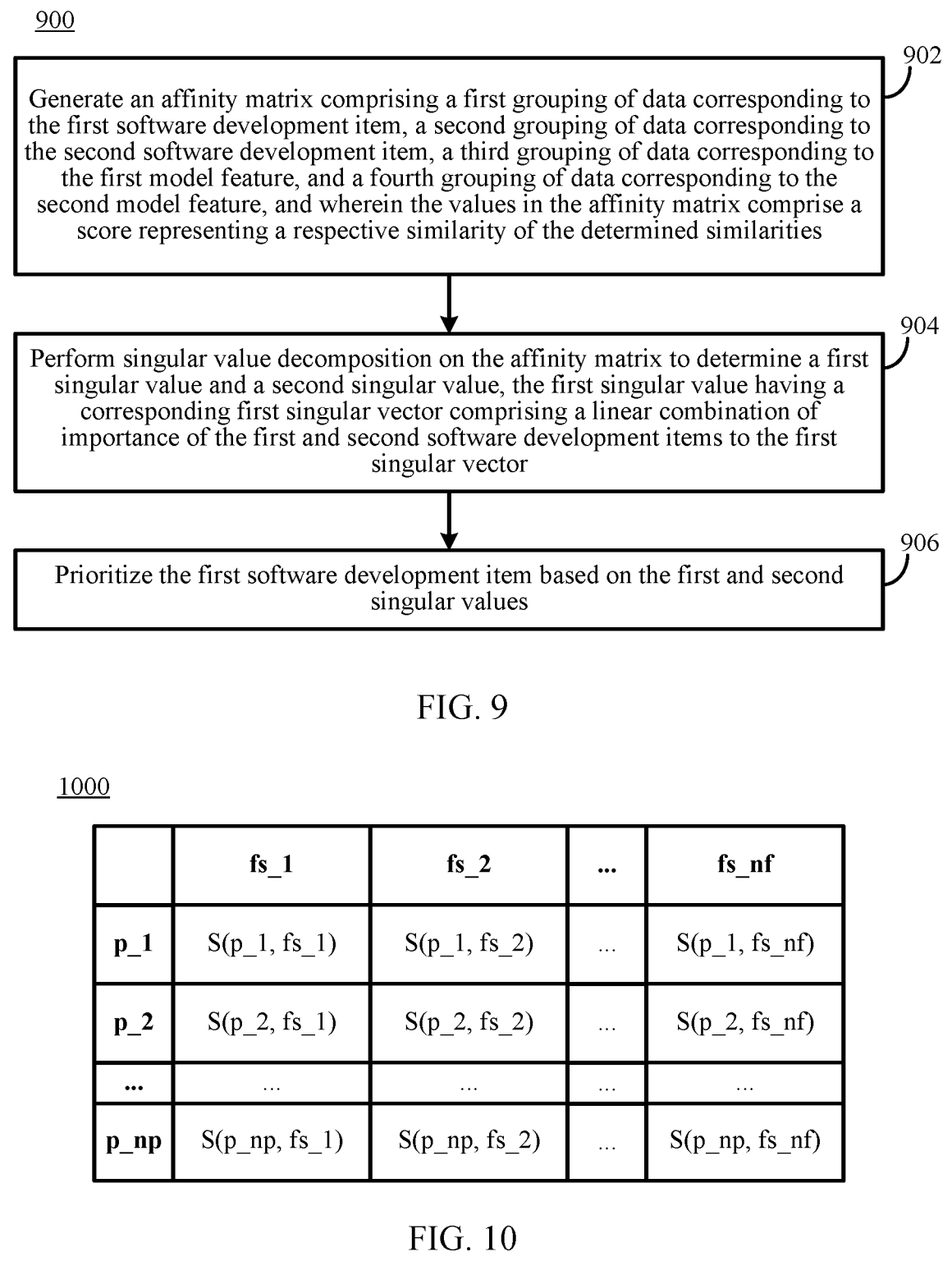

Generate an affinity matrix comprising a first grouping of data corresponding to the first software development item, a second grouping of data corresponding to the second software development item, a third grouping of data corresponding to the first model feature, and a fourth grouping of data corresponding to the second model feature, and wherein the values in the affinity matrix comprise a score representing a respective similarity of the determined similarities

902

Perform singular value decomposition on the affinity matrix to determine a first singular value and a second singular value, the first singular value having a corresponding first singular vector comprising a linear combination of importance of the first and second software development items to the first singular vector

904

Prioritize the first software development item based on the first and second singular values

|  | fs_1 | fs_2 | ... | fs_nf |
|---|---|---|---|---|
| p_1 | S(p_1, fs_1) | S(p_1, fs_2) | ... | S(p_1, fs_nf) |
| p_2 | S(p_2, fs_1) | S(p_2, fs_2) | ... | S(p_2, fs_nf) |
| ... | ... | ... | ... | ... |
| p_np | S(p_np, fs_1) | S(p_np, fs_2) | ... | S(p_np, fs_nf) |

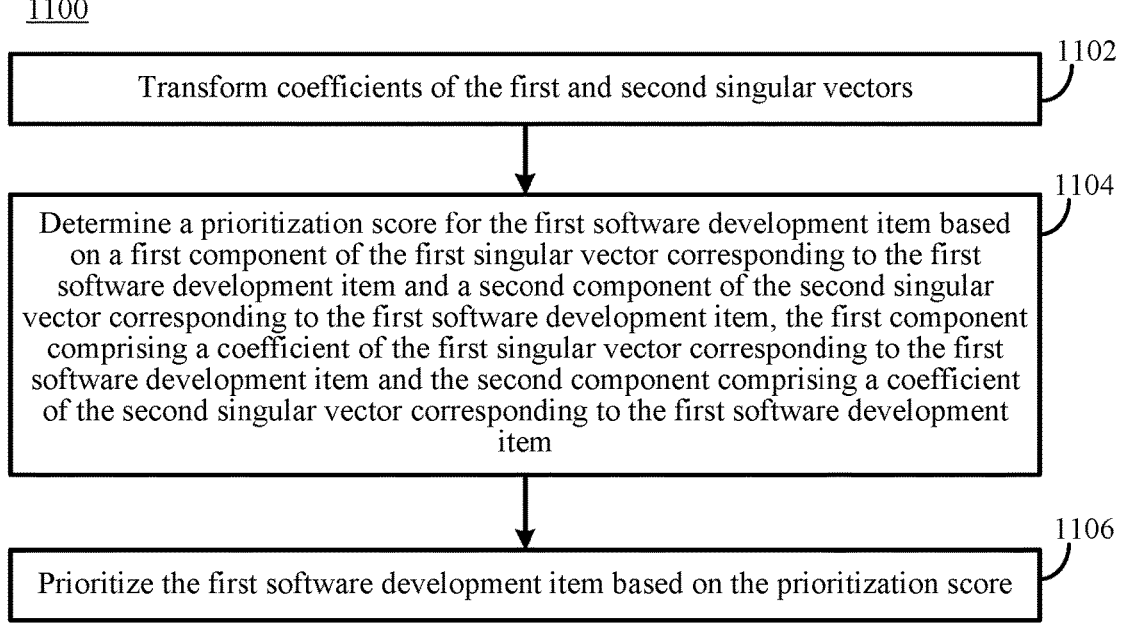

1102
Transform coefficients of the first and second singular vectors

1104
Determine a prioritization score for the first software development item based on a first component of the first singular vector corresponding to the first software development item and a second component of the second singular vector corresponding to the first software development item, the first component comprising a coefficient of the first singular vector corresponding to the first software development item and the second component comprising a coefficient of the second singular vector corresponding to the first software development item 1106
Prioritize the first software development item based on the prioritization score

Step 904

1202
Apply an absolute value transformation to the coefficients

1204
Apply a squaring transformation to the coefficients

1206
Apply a scale transformation to the coefficients based on a measure of importance the corresponding singular value has in varying the determined similarities Step 1104

FIG. 12

SOFTWARE DEVELOPMENT PRIORITIZATION USING TRAINED MODEL

BACKGROUND

Software development projects can be broken down into actionable items, also referred to as software development items. As software development items are added to a list of action items to be handled by a software development team, a backlog forms. The actionable items in a backlog are also referred to as product backlog items or "PBIs". Development regarding different PBIs is prioritized in order to make efficient use of a development team's time. In order to effectively prioritize PBIs, a development team (or the software owner) determines market needs and/or customer experience and how PBIs would impact them.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for prioritizing software development using a trained model. For instance, in an example embodiment, a first model feature and a second model feature are determined based on analysis of user behavior with respect to a software application. The first and second model features are received by a software development prioritization (SDP) system. The SDP system determines data associated with the model features and utilizes a generative artificial intelligence (AI) model, e.g., a large language model (LLM), to generate summaries for the model features based on the determined data. The SDP system determines, based on the summaries, a similarity between software development items and the model features. The SDP system prioritizes one of the software development items over another based on the determined similarities.

In a further embodiment, the SDP system causes a first software development task corresponding to the prioritized software development item to be performed before a second software development task corresponding to a different software development item.

In a further embodiment, the first and second model features are received from a machine learning (ML) model trained to predict user behavior. In this further embodiment, an ML trainer receives telemetry data describing user behavior with respect to a software application and utilizes the telemetry data to train the ML model to predict user behavior with respect to the software application. A set of model features are extracted from the trained ML model and the first and second model features are selected from the set.

In a further embodiment, an affinity matrix comprising values that represent scores representing respective similarities between software development items and model features is generated. Singular value decomposition is performed on the affinity matrix to determine singular values and the software development items are prioritized based on the singular values.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3 shows a flowchart of a process for software development prioritization, in accordance with an example embodiment.

FIG. 4 shows a flowchart of a process for developing software, in accordance with an example embodiment.

FIG. 7 shows a block diagram of a system for determining a similarity between a software development item and a model feature, in accordance with an example embodiment.

FIG. 8 shows a flowchart of a process for determining a similarity between a software development item and a model feature, in accordance with an example embodiment.

FIG. 9 shows a flowchart of a process for prioritizing software development, in accordance with an example embodiment.

FIG. 10 shows an example of an affinity matrix, in accordance with an example embodiment.

FIG. 11 shows a flowchart of a process for prioritizing software development, in accordance with another example embodiment.

FIG. 12 shows a flowchart of a process for transforming coefficients of singular vectors, in accordance with an example embodiment.

Figure 1:
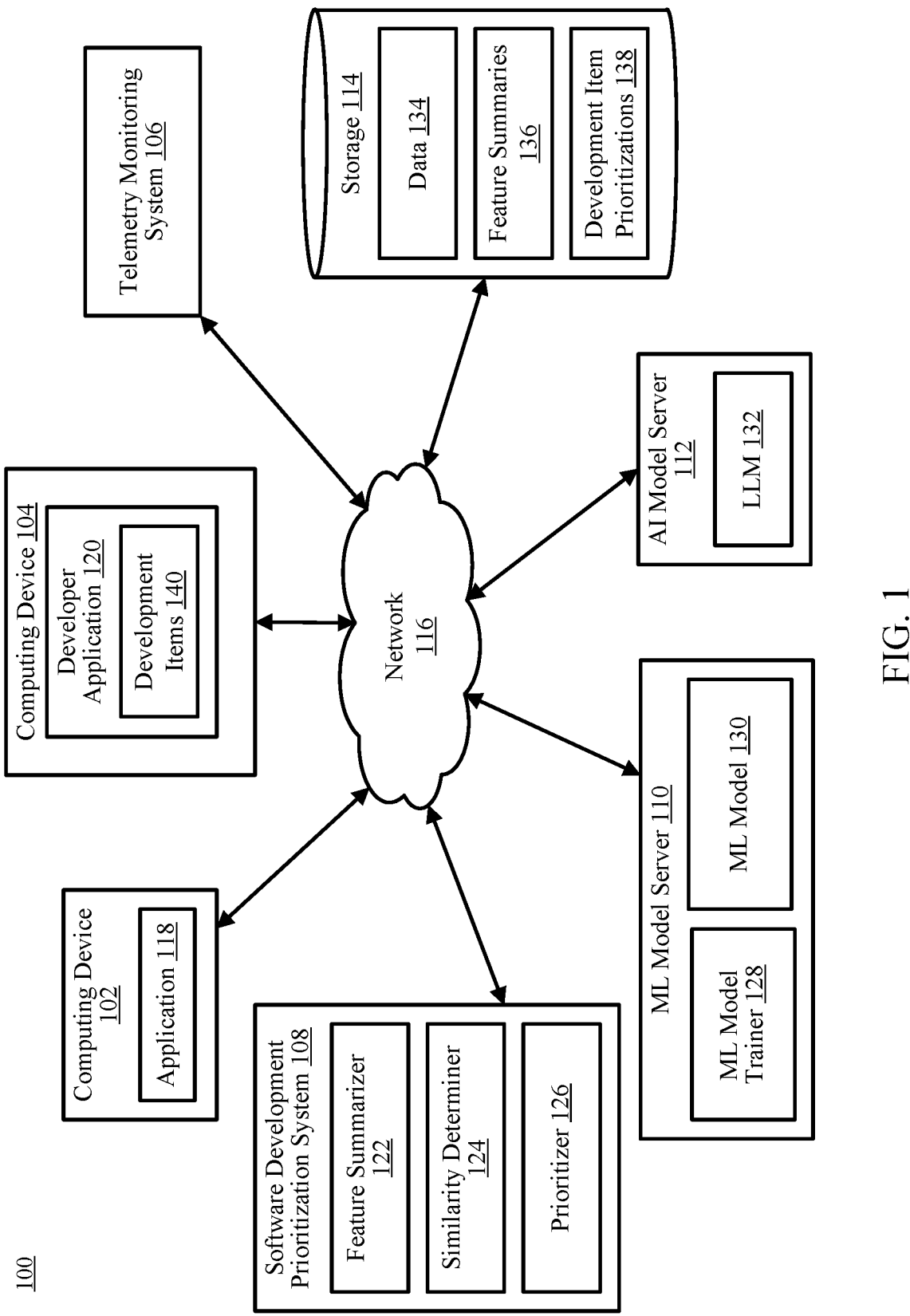
FIG. 1 shows a block diagram of a system for software development prioritization, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Search Query Interpretation and Response

The software development process is approached in various ways. For instance, in an aspect of software development, a software development team details tasks into a product development backlog. The product development backlog includes features or stories. In some aspects, features and stories are broken into actionable backlog items (also referred to as product backlog items or "PBIs"). In order to efficiently utilize engineering resources and time, PBIs are prioritized. In some aspects, the prioritization of PBIs is updated throughout the development process (e.g., by the product owner, by the development team, etc.). For instance, a product owner (e.g., an individual, a group of individuals, an organization, etc.) in accordance with an implementation prioritizes PBIs based on which PBI has the most impact on customer experience and market needs. In order to determine how customer experience and market needs are impacted, systems, product owners, and developers attempt to understand needs and pain points of users. In some implementations of software development prioritization, qualitative methods such as focus group studies or surveys are used to understand needs and pain points.

Qualitative-based techniques for software development prioritization face a few potential issues. For instance, qualitative techniques that do not rely on objective data sources tend to be driven by heuristics and a product owners' experience, which can introduce bias creep, resulting in sub-optimal prioritization. Furthermore, in-person interviews and customer surveys can have varying reliability and are subjective in nature.

Embodiments of the present disclosure leverage behavior of software product users (e.g., individual users, customer users, family users, groups of users, employee users, organization users, etc.). In embodiments, the behavior of software product users is gathered via telemetry and utilized to train a machine learning (ML) model. In an aspect, the ML model is trained to predict user retention for a software product (e.g., a software application) based on the telemetry. Model features of the ML model represent user interactions and other measurements used for determining likelihood of user retention. Examples of model features include, but are not limited to, the last time a user utilized a software application (e.g., the last session a user opened and closed), how many times a user interacted with an element of a GUI of the software application (e.g., a button, a text box, a slider, etc.), how many times an action was performed utilizing the software application (e.g., number of e-mails sent in a week), how many times a feature was used, whether or not a feature was disabled, how many times the user utilized the software of application during a period of time (e.g., how many times the user logged into the application), a rate of change in usage of an application or software feature, and/or the like. In an aspect, each model feature has a weight that corresponds to the impact that model feature has in determining whether or not a user is likely to be retained. In order to prioritize software development items (e.g., PBIs), the model features of the ML model are matched to software development items. The PBIs are prioritized based on the matched features. In this manner, a quantitative evaluation of relative importance of a software development item is determined based on data-driven expected impact on software product users.

In some aspects of the present disclosure, a summary of a model feature (also referred to as a "feature summary" herein) is matched to a software development item. In this context, the feature summary is generated based on the model feature and data associated with it. In some embodiments of the present disclosure, a generative artificial intelligence (AI) model is utilized to generate the feature summary. A generative AI model is a model that generates content that is complex, coherent, and/or original. For instance, a generative AI model can create sophisticated sentences, lists, ranges, tables of data, images, essays, and/or the like. An example of a generative AI model is a language model. For instance, a large language model (LLM) is leveraged by some embodiments described herein. An LLM is a language model that has a high number of model parameters (e.g., weights and biases the model learns during training). An LLM is (pre-) trained using self-supervised learning and/or semi-supervised learning. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

Figure 13:
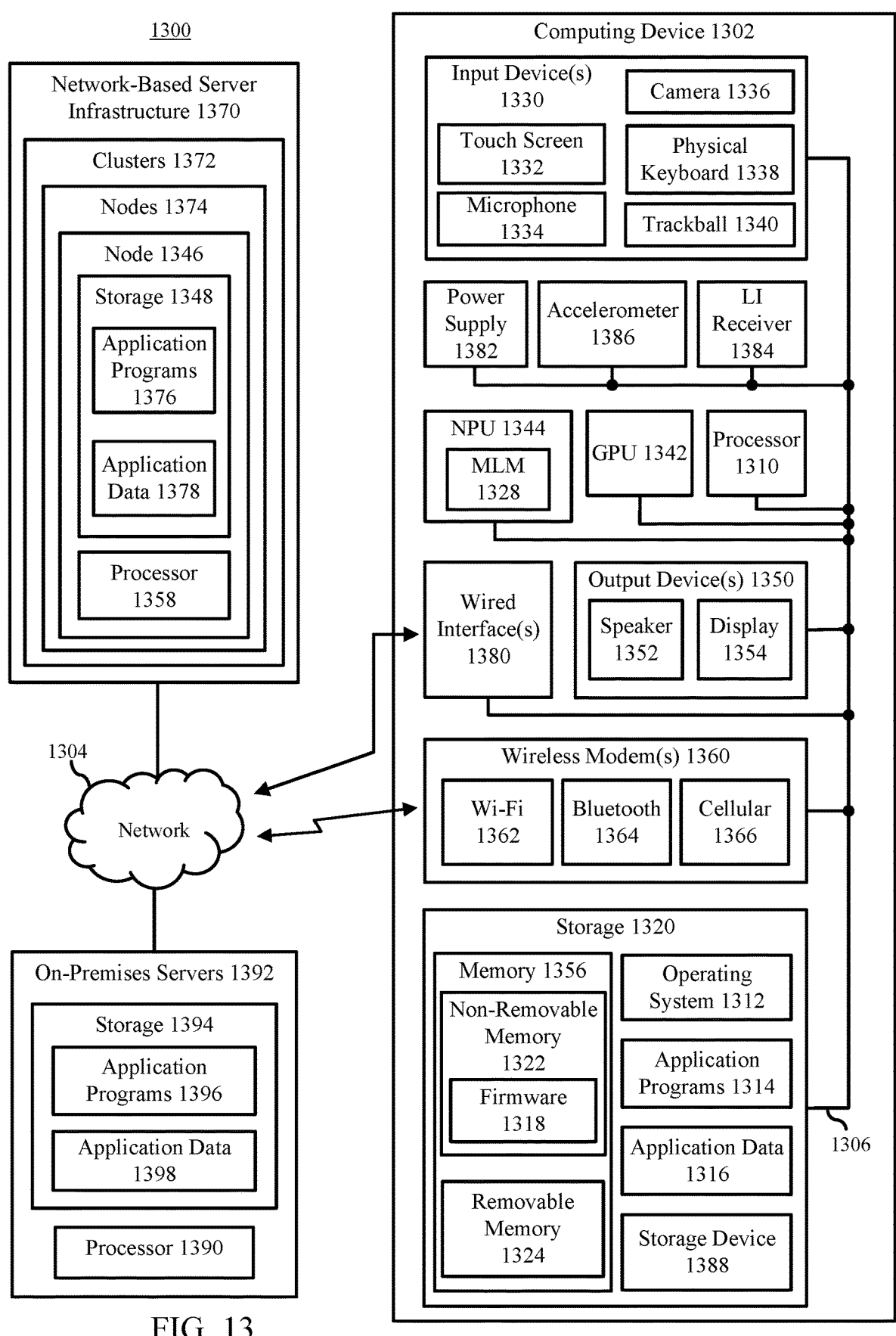
FIG. 13 shows a block diagram of an example computing environment in which embodiments may be implemented.

Additional details regarding transformer-based LLMs (and generative AI models in general) are described with respect to FIG. 13, as well as elsewhere herein.

In examples, systems, devices, and apparatuses are configured in various ways for prioritizing software development. For example, FIG. 1 shows a block diagram of a system 100 for software development prioritization, in accordance with an example embodiment. System 100 comprises a computing device 102, a computing device 104, a telemetry monitoring system 106, a software development prioritization (SDP) system 108, an ML model server 110, an AI model server 112, and a storage 114. Computing device 102, computing device 104, telemetry monitoring system 106, SDP system 108, ML model server 110, AI model server 112, and storage 114 are communicatively coupled via network 116. In examples, network 116 comprises one or more networks such as local area networks (LANs), wide area networks (WANs), enterprise networks, the Internet, etc. In examples, network 116 comprises one or more wired and/or wireless portions. The features of system 100 are described in detail as follows.

Storage 114 stores data used by and/or generated by computing device 102, computing device 104, telemetry monitoring system 106, SDP system 108, ML model server 110, AI model server 112, and/or components thereof and/or services executing thereon. For instance, as shown in FIG. 1, storage 114 stores data 134, feature summaries 136, and development item prioritizations 138. Data 134 comprises documents, files, images, and other pieces of data describing products (e.g., applications such as application 108). Examples of data 134 include, but are not limited to, product help documents, support manuals, product support question-answers, e-mail threads from a support tool, documents describing a feature of a product, text related to a feature of a product, product advertisements, and/or any other piece of data related to a product and/or its features. Feature summaries 136 are summaries (e.g., concisely) describing a model feature. In accordance with an embodiment described with respect to FIGS. 2 and 3 (as well as elsewhere herein), feature summaries 136 are generated utilizing a generative AI model. Development item prioritizations 138 comprise prioritization data for software development items generated by SDP system 108. In examples, development item prioritizations 138 comprise vector data describing software development item prioritization, a ranked list of software development items, tuples indicating prioritization of software development items, and/or any other type of information and/or data indicating or otherwise describing the prioritization of software development items.

In examples, computing device 102 and computing device 104 are any type of stationary or mobile processing devices, including, but not limited to, desktop computers, servers, mobile or handheld devices (e.g., tablets, personal data assistants (PDAs), smart phones, laptops, etc.), Internet-of-Things (IoT) devices, etc. In accordance with an embodiment, computing device 102 is associated with a user (e.g., an individual user, a group of users, an organization, a family user, a customer user, an employee user, etc.), also referred to herein as an "end-user", and computing device 104 is associated a development user (e.g., a programmer user, a developer user, a team of development users, a product owner, etc.). As shown in FIG. 1, computing device 102 is configured to execute an application 118 and computing device 104 is configured to execute a developer application 120. In accordance with an embodiment, application 118 enables an end-user to perform tasks (e.g., view content, manage content, access a network, access network-accessible storage, access web pages, send and/or receive e-mail, generate documents, take pictures, and/or any other type of task performable by a software application).

In accordance with an embodiment, developer application 120 enables a development user to perform tasks related to the development of application 118 (e.g., manage software development items related to development of application 118, modify a software development item, perform a sub-task related to a software development item, write code related to a software development item, instantiate an update to application 118 associated with a software development item, and/or the like). For example, as shown in FIG. 1, developer application 120 comprises development items 140. Development items 140 comprise one or more software development items associated with application 118 (and, optionally, other applications developed by a development user of computing device 104). In examples, development items 140 comprise a software development item related to a feature of application 118, a software development item related to a component of a feature, a software development item related to a group of features (also referred to as a "feature story"), a software development item related to a group of feature stories (also referred to as a "feature scenario") and/or any other type of software development task to be performed with respect to application 118 (and/or other applications developed using application 120). For instance, in accordance with an embodiment wherein application 118 is an e-mail management application, development items 140 comprise a back-end coding development item related to a sending e-mail feature of application 118, a back-end coding development item related to an appointment booking feature of application 118, a front-end coding development item, a network interface coding development item, a user interface design development item, and/or other software development items related to e-mail management.

Telemetry monitoring system 106 is configured to monitor execution and use of applications by end-users. For instance, telemetry monitoring system 106 in accordance with an embodiment monitors the execution of and use of application 118, actions taken involving application 118, and/or other user behavior with respect to application 118. Examples of user behaviors and actions with respect to an application include, but are not limited to, installing and/or uninstalling an instance of application 118, utilizing a feature of application 118, enabling and/or disabling a feature of application 118, configuring another setting of application 118, enabling a permission of application 118, denying and/or disabling a permission of application 118, providing feedback with respect to a feature of application 118 (e.g., rating a feature of application 118), favoriting a feature of application 118, and/or any other behavior or action related to the execution of and/or use of application 118. In some examples, telemetry monitoring system 106 measures the amount of time a user utilizes application 118 (e.g., since installing, within a predetermined time (e.g., in the last number of hour(s), day(s), week(s), year(s), etc.), etc.). In accordance with an embodiment, telemetry monitoring system stores telemetry data in a data store (e.g., storage 114, memory of telemetry monitoring system 106, and/or another data store accessible to telemetry monitoring system 106). In accordance with an embodiment, telemetry monitoring system 106 reports telemetry to another component of system 100 (e.g., computing device 104, SDP system 108, ML model server 110).

ML model server 110 and AI model server 112 are network-accessible servers (or other types of computing devices). In accordance with an embodiment, one or both of ML model server 110 and/or AI model server 112 are incorporated in a network-accessible server set (e.g., a cloud-based environment, an enterprise network server set, and/or the like). Furthermore, as shown in FIG. 1, each of ML model server 110 and AI model server 112 are single servers or other computing devices. In an alternative example embodiment, either ML model server 110 and/or AI model server 112 are implemented across multiple servers or computing devices (e.g., as a distributed server). In accordance with another alternative example embodiment, ML model server 110 and AI model server 112 are incorporated in the same server. Each of ML model server 110 and AI model server 112 are configured to execute services and/or store data. For instance, as shown in FIG. 1, ML model server 110 is configured to execute an ML model trainer 128 and store and/or execute an ML model 130 and AI model server 112 is configured to store and/or execute a large language model (LLM) 132. In accordance with an embodiment, SDP system 108 interfaces with ML model trainer 128, ML model 130, and/or LLM 132 over network 116.

ML model trainer 128 comprises logic for training ML model 130. In accordance with an embodiment, ML model trainer 128 trains ML model 130 to predict user retention (e.g., the likelihood an end-user is going to continue using an application). In examples, ML model trainer 128 in accordance with an embodiment trains ML model 130 utilizing supervised learning, unsupervised learning, or a combination of unsupervised and supervised learning techniques. For instance, in accordance with an embodiment described further with respect to FIGS. 5 and 6 (as well as elsewhere herein), ML model trainer 128 trains ML model 130 to predict the likelihood of user retention based on telemetry data produced by telemetry monitoring system 106. In accordance with an embodiment, once trained, ML model 130 comprises a set of model features, which are components of the model that are used to predict the likelihood of user retention. In examples, the set of model features comprise any type of model feature described elsewhere herein. In examples, weights are assigned to and/or adjusted for model features as ML model 130 is trained by ML model trainer 128.

SDP system 108 is configured to prioritize software development items (e.g., development items 140). In accordance with an embodiment, SDP system 108 is implemented as a computing device or a set of networked computing devices. In embodiments, SDP system 108 prioritizes software development items on a routine basis (e.g., once a day, once a week, at the beginning of the month, and/or the like), in response to a request to prioritize development items 140 received from developer application 120, subsequent to (e.g., responsive to) software development items being added to development items 140, or subsequent to (e.g., responsive to) a software development item being removed from development items 140. As shown in FIG. 1, SDP system 108 comprises a feature summarizer 122, a similarity determiner 124, and a prioritizer 126, each of which are implemented as subcomponents of and/or subservices executed by SDP system 108. For instance, in accordance with an embodiment, one or more of feature summarizer 122, similarity determiner 124, and prioritizer 126 are implemented as program code structured to cause a processor of SDP system 108 (not shown in FIG. 1) to perform corresponding operations described herein. Feature summarizer 122 comprises logic for receiving model features, summarizing model features, receiving (or otherwise obtaining/retrieving) data (e.g., data 134), accessing a data store (e.g., storage 114), prompting LLM 132 to generate a feature summary, storing feature summaries in a data store, and/or performing any other operations related to summarizing model features described elsewhere herein. Similarity determiner 124 comprises logic for determining similarities between model features (or model feature summaries) and software development items (e.g., development items 140), generating affinity matrices, interfacing with an embedding model (e.g., LLM 132 or another type of model not shown in FIG. 1), evaluating embeddings, and/or performing any other operations related to determining similarities between model features and software development items described herein. Prioritizer 126 comprises logic for prioritizing software development items based on determined similarities, factorizing matrices, transforming vectors, determining prioritization scores, causing software development tasks to be performed in a particular order, and/or performing any other operations related to prioritization of software development items described herein. Additional details regarding SDP system 108 and its subcomponents are described with respect to FIGS. 2-4, as well as elsewhere herein.

In some implementations, SDP system 108 (or a component thereof) performs a software development task corresponding to a software development item with a higher priority relative to another software development item. Alternatively, SDP system 108 causes developer application 120 to perform the software development task based on prioritization of development items 140. Additional details regarding performing software development tasks are described with respect to FIG. 4, as well as elsewhere herein.

LLM 132 is configured to generate summaries of model features based on input (e.g., prompts received from SDP system 108). In an example, LLM 132 is trained using public information (e.g., information collected and/or scrubbed from the Internet) and/or data stored by an administrator of AI model server 112 (e.g., stored in memory of AI model server 112 and/or memory accessible to model server 112). In accordance with an embodiment, LLM 132 is an "off the shelf" model trained to generate complex, coherent, and/or original content based on (e.g., any) prompts. In an alternative embodiment, LLM 132 is a specialized model trained to generate summaries of model features based on prompts. Additional details regarding the operation and training of LLMs such as LLM 132 are described with respect to FIG. 13, as well as elsewhere herein.

Figure 2:
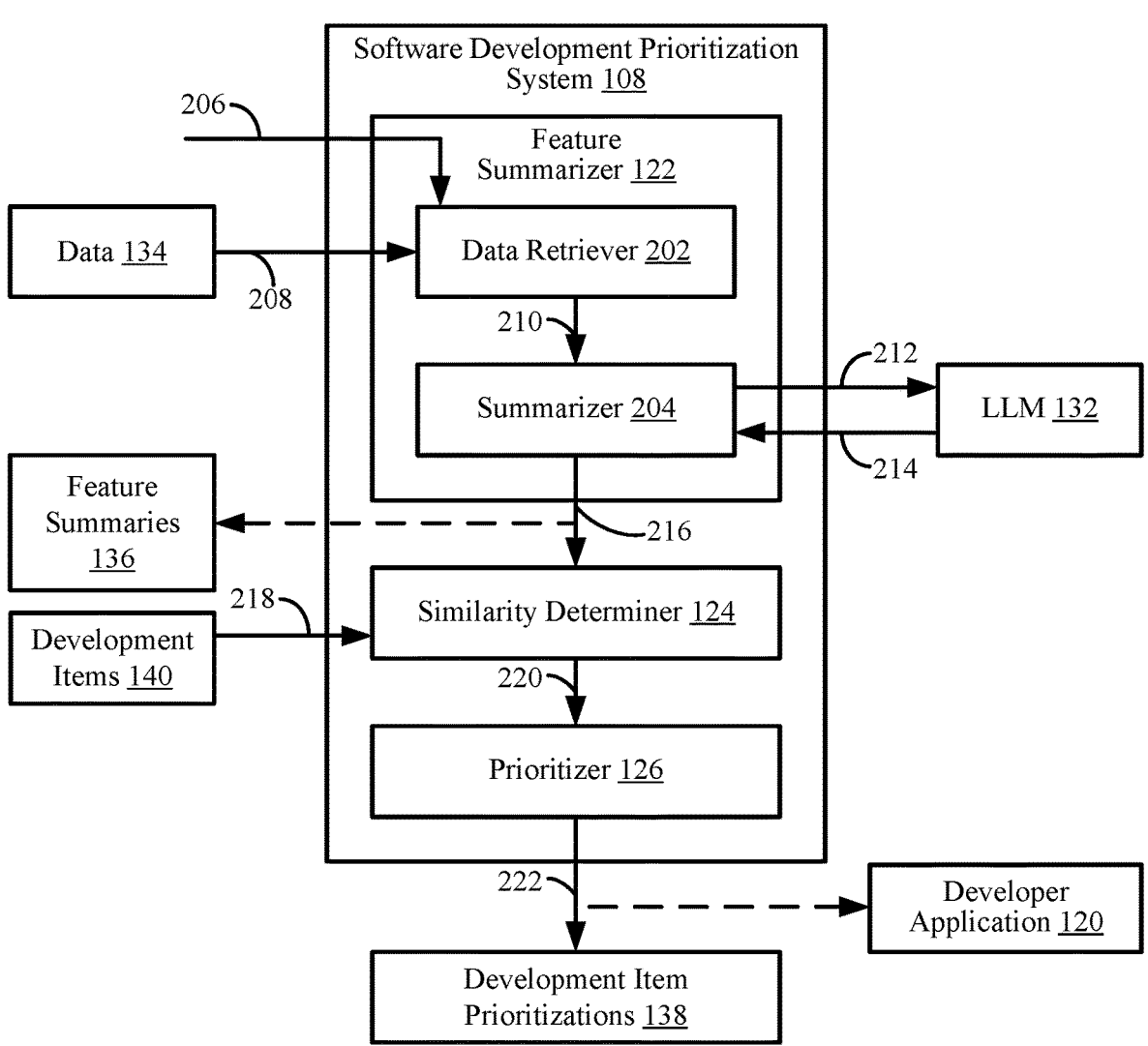
FIG. 2 shows a block diagram of a system for software development prioritization, in accordance with another example embodiment.

Implementations of SDP system 108 of FIG. 1 are configured in various ways to prioritize software development items. For example, FIG. 2 shows a block diagram of a system 200 for software development prioritization, in accordance with another example embodiment. As shown in FIG. 2, system 200 comprises SDP system 108 (comprising feature summarizer 122, similarity determiner 124, and prioritizer 126), developer application 120, LLM 132, data 134, feature summaries 136, development item prioritizations 138, and development items 140, as described with respect to FIG. 1. As also shown in FIG. 2, feature summarizer 122 comprises a data retriever 202 and a summarizer 204, each of which are implemented as sub-services and/or subcomponents of feature summarizer 122. Data retriever 202 comprises logic to retrieve data associated with a model feature and summarizer 204 comprises logic to generate prompts to LLM 132 and/or generate feature summaries. In order to better understand the operation of SDP system 108, FIG. 2 is described with respect to FIG. 3. FIG. 3 shows a flowchart 300 of a process for software development prioritization, in accordance with an example embodiment. In accordance with an embodiment, SDP system 108 of FIG. 2 operates according to flowchart 300. Not all steps of flowchart 300 need be performed in all embodiments. Further structural and operational embodiments will be apparent to persons skilled in the relevant art(s) based on the following descriptions of FIGS. 2 and 3.

Flowchart 300 begins with step 302. In step 302, a first model feature and a second model feature are received, the first and second model features determined based on analysis of user behavior with respect to a software application. For example, data retriever 202 of FIG. 2 receives first and second model features 206 ("model features 206" herein). Model features 206 are determined based on analysis of user behavior with respect to a software application. In examples, model features 206 are determined based on quantitative analysis of data points representative of user behavior with respect to application 118. In accordance with an embodiment, model features 206 are received from ML model server 110. In this context, model features 206 are features of ML model 130. In accordance with a further embodiment, model features 206 are a subset of features of ML model 130 (e.g., model features with a level of impact on determining user behavior that satisfies selection criteria). Further details regarding the use of ML model 130 to determine and select model features 206 are described with respect to FIGS. 5 and 6, as well as elsewhere herein.

In step 304, data associated with the first and second model features is determined. For example, data retriever 202 of FIG. 2 determines data 210 associated with computing features 206. As shown in FIG. 2, data retriever 202 receives data 208 from data 134. Data 208 comprises any type of data related to model features 206. For instance, data 208 comprises documents, files, and other pieces of data related to model features 206. In accordance with an embodiment, data 208 comprises data related to model features of applications other than application 118 that are similar to model features 206. For instance, in accordance with an embodiment, data retriever 202 retrieves (or otherwise obtains) data related to similar features of a competitor application. In accordance with an embodiment, data retriever 202 determines data 208 is associated with model features 206 based on text matching (e.g., matching text between model features 206 and pieces of data 134). Alternatively, data retriever 202 determines data 208 based on pieces of data 134 that are semantically similar to model features 206 (e.g., based on embeddings such as vectors of floating-point numbers such that the distance between two embeddings in vector space is correlated with semantic similarity between two inputs in their original format) representative of the pieces of data 134 and embeddings representative of model features 206. In accordance with an embodiment, the embeddings are generated utilizing an embedding model (not shown in FIG. 2 for brevity). In accordance with an embodiment, embeddings of data 134 are stored alongside data 134. In accordance with an embodiment, embeddings of model features 206 are received alongside model features 206 in step 302. As shown in FIG. 2, data retriever 202 provides data 208 as data 210 to summarizer 204 and flowchart 300 continues to step 306.

In step 306, an LLM is utilized to generate, based on the determined data, a first feature summary for the first model feature and a second feature summary for the second model feature. For example, summarizer 204 of FIG. 2 utilizes LLM 132 to generate feature summaries 216, where feature summaries 216 comprises respective summaries of model features 206. In accordance with an embodiment, the feature summary for a model feature is referred to as a "reference summary" or "reference feature." As shown in FIG. 2, summarizer 204 generates a prompt 212 that causes LLM 132 to generate a response 214. In an example, prompt 212 comprises model features 206 and data 210 and response 214 comprises feature summaries of model features 206 that textually describe each of the model features. In accordance with an alternative embodiment, summarizer 204 places a separate prompt to LLM 132 for each model feature of model feature 206. In this context, each prompt comprises the corresponding model feature and pieces of data 210 that are associated with the model feature. In either case, summarizer 204 provides feature summaries received from LLM 132 to similarity determiner 124 as feature summaries 216 and flowchart 300 continues to step 308.

As a non-limiting example, suppose the first model feature is related to the number of times a user has logged into an application in a week. In this context, data 208 comprises data semantically related to a number of times a user logs into an application in a week (e.g., support logs related to weekly log-ins, product documentation related to the log-in process, historical data related to weekly log-in behavior of users, documents showing differences between the log-in process for different software applications, etc.). Summarizer 204 generates prompt 212 to cause LLM 132 to generate a summary of the number of times a user logs into an application in a week based on the semantically related data.

Thus, examples of retrieving data associated with a model feature and generating a summary for the model feature has been described with respect to steps 304 and 306 of flowchart 300. In accordance with an embodiment, data retriever 202 and summarizer 204 form a retrieval-augmented generation (RAG) system for generating feature summaries 216. In the RAG system implementation, data retriever 202 determines embeddings for model features 206 (e.g., utilizing LLM 132 or an embedding model not shown in FIG. 2) and retrieves relevant data 208 that has embeddings semantically similar to the embeddings of model features 206. In this example, summarizer 204 generates prompt 212 based on a model feature and its corresponding relevant pieces of data and prompts LLM 132 to summarize the model feature (provided in response 214).

In some embodiments, and as optionally shown in FIG. 2 via a dashed line, summarizer 204 stores feature summaries 216 as (e.g., part of) feature summaries 136. In this context, feature summaries 216 can be generated prior to determination of priorities. Furthermore, feature summaries for overlapping determinations of prioritization can be accessed without having to place additional calls to LLM 132. For instance, suppose a subsequent prioritization request is handled. In this prioritization request, suppose a model feature of model features 206 is included in the model features 206. In this context, SDP system 108 is able to access previously generated feature summaries for the reoccurring model features without having to retrieve data (e.g., via data retriever 202) or placing additional calls to LLM 132 (e.g., via summarizer 204). In this context, compute resources and time spent are reduced. Furthermore, in some embodiments, feature summaries are generated "offline" (e.g., separate from or otherwise independent from when software development items are prioritized). In this context, a library of feature summaries of features impactful to user retention is generated prior to a request to prioritize software development items. In this context, software development items can be prioritized (as described elsewhere herein, such as in reference to the following steps of flowchart 300) without SDP system 108 making additional calls to LLM 132 (which takes time and compute resources), thereby prioritizing software development items efficiently and in a timely manner.

In step 308, similarities between a first software development item and the first model feature, a second software development item and the first model feature, the first software development item and the second model feature, and the second software development item and the second model feature are determined based on the first and second feature summaries. For example, similarity determiner 124 of FIG. 2 receives feature summaries 216 and software development items 218. In examples, software development items 218 comprises all of, one of, or a subset of development items 140. Similarity determiner 1224 determines similarities between features and software development items based on feature summaries 216 ("similarities 220" in FIG. 2). In accordance with an embodiment, similarity determiner 124 determines a similarity between a software development item and a model feature by matching text between the software development item and the feature summary of feature summaries 216 for that model feature. In accordance with an embodiment further described with respect to FIGS. 7 and 8 (as well as elsewhere herein), similarity determiner 124 matches software development items and model features based on semantic similarities.

In accordance with an embodiment, similarities determined by similarity determiner 124 are "similarity scores" that each indicate how similar a software development item is to a model feature. In examples, similarity scores are on a scale (e.g., 1 to 10, 0 to 1, 0 to 100, 0 to 10, etc.). In this context, the lowest score (e.g., 0 on a 0 to 1 scale) indicates that the software development item and the model feature do not have anything in common and the highest score (e.g., 1 on a 0 to 1 scale) indicates that the software development item and the model feature are highly similar/related to each other. In accordance with an embodiment further described with respect to FIGS. 9 and 10 (as well as elsewhere herein), similarity determiner 124 generates an "affinity matrix" for pairwise combinations of model features and software development items.

In step 310, the first software development item is prioritized based on the determined similarities. For example, prioritizer 126 of FIG. 2 prioritizes one or more of software development items 218 based on similarities 220. As shown in FIG. 2, prioritizer 126 generates prioritization data 222. In accordance with an embodiment, prioritizer 126 updates development item prioritizations 138 based on prioritization data 222. In accordance with another embodiment, prioritizer 126 provides prioritization data 222 to developer application 120 for use in prioritizing software development tasks. In examples, prioritization data 222 comprises an ordered list of software development items 218, a subset of software development items 218 (e.g., the top three prioritized software development items), and/or any other data/information regarding the prioritization of software development items, as described elsewhere herein.

As a non-limiting example, suppose a model feature is "the number of times a user has logged into an application in the last week," a first software development item is the login experience of application 118, and a second software development item is a send e-mail function of application 118. Further suppose the similarity between the model feature and the first software development item determined in step 308 is higher than the determined similarity between the model feature and the second software development item. Still further, suppose the model feature has the highest correlation to user retention among the computing features. In this non-limiting example, prioritizer 126 prioritizes the first software development item (related to login experience of application 118) over the second software development item (related to sending an e-mail) based on the determined similarities.

In examples, prioritization data 222 is used to improve efficiency in developing software applications in various ways. For example, FIG. 4 shows a flowchart 400 of a process for developing software, in accordance with an example embodiment. In accordance with an embodiment, SDP system 108 and/or developer application 120 of FIG. 2 operate according to flowchart 400. Flowchart 400 need not be performed in all embodiments. Further structural and operational embodiments will be apparent to persons skilled in the relevant art(s) based on the following description of FIG. 4 with respect to FIG. 2.

Flowchart 400 comprises step 402. In step 402, a first software development task corresponding to the first software development item is performed prior to a second software development task corresponding to the second software development item. For example, in accordance with an embodiment, SDP system 108 (or a component thereof) performs a first software development task corresponding to a first software development item prior to a second software development task corresponding to a second software development item with a lower level of priority than the first software development item. Alternatively, developer application 120 performs a first software development task corresponding to a first software development item prior to a second software development task corresponding to a second software development item with a lower level of priority than the first software development item. Examples of software development tasks include, but are not limited to, receiving software code related to a software development item, receiving a modification to the software code, testing software code related to a software development item, receiving a modification to a user interface related to a software development item, executing the software code, detecting an error in the software code, causing an error message to be displaced in a graphic user interface (GUI) of developer application 120 indicating a detected error in the software code, receiving design information for a user interface related to the software development item, and/or any other type of task related to the development of a software application performed by developer application 120. By performing a software development task in this manner, developer application 120 improves the functionality of application 118 (e.g., by modifying code, adding new features, validating code, etc.), Furthermore, by leveraging prioritization data 222 in performance of software development tasks, developer application 120 improves functionality of application 118 in a manner that improves software development efficiency, user experience, and user retention.

Figure 5:
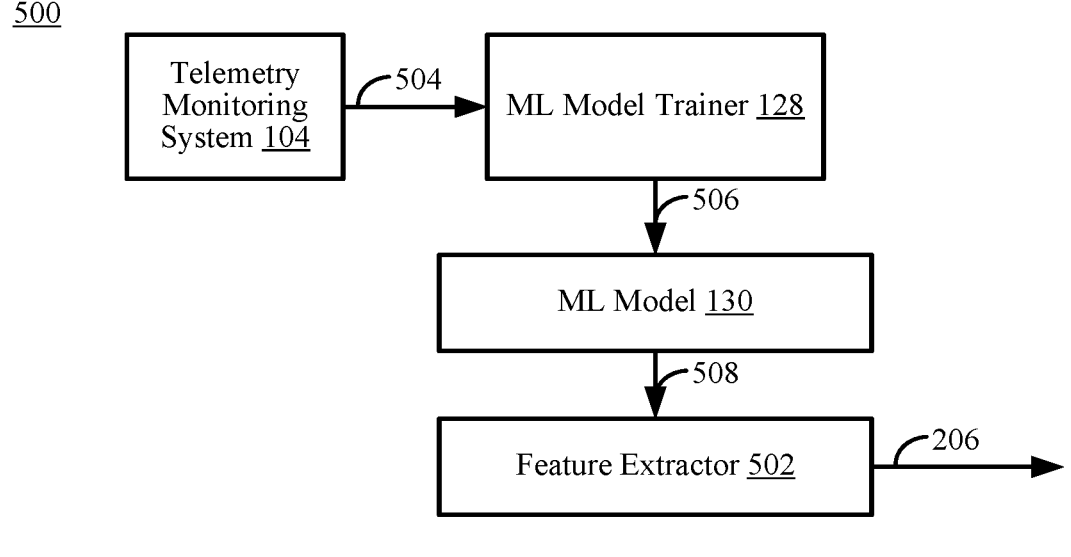
FIG. 5 shows a block diagram of a system for selecting model features, in accordance with an example embodiment.

As described herein, SDP system 108 receives model features determined based on analysis of user behavior with respect to an application (e.g., application 118). In some embodiments, the model features are determined based on analysis of user behavior and training of a ML model (e.g., ML model 130 of FIG. 1). Systems described herein are configured in various ways to train and extract model features from ML models. For instance, FIG. 5 shows a block diagram of a system 500 for selecting model features, in accordance with an example embodiment. As shown in FIG. 5, system 500 comprises monitoring system 104, ML model trainer 128, and ML model 130 as described with respect to FIG. 1, and also a feature extractor 502. Feature extractor 502 is configured to extract features from ML model 130 and select which model features to use as features in prioritizing software development items. In accordance with an embodiment, feature extractor 502 is a subcomponent/subservice of ML model server 110 (e.g., incorporated in ML model trainer 128 or as a separate component/service of ML model server 110). In accordance with another embodiment, feature extractor 502 is a subservice/subcomponent of SDP system 108. Alternatively, feature extractor 502 is a standalone service and/or a subcomponent/subservice of another component of system 100 of FIG. 1.

Figure 6:
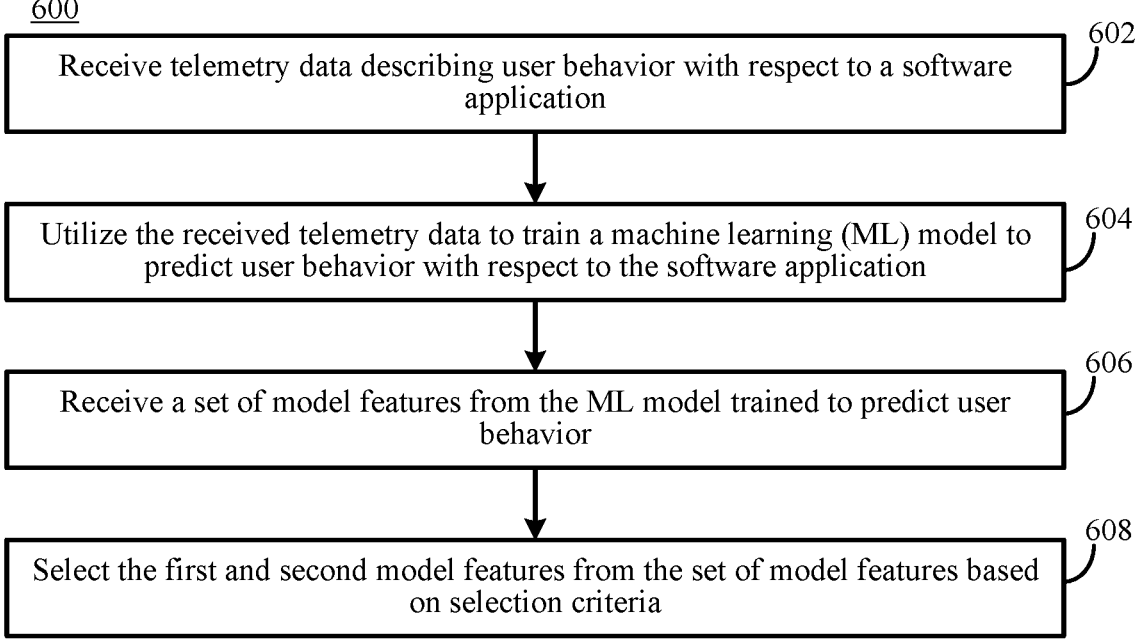
FIG. 6 shows a flowchart of a process for selecting model features, in accordance with an example embodiment.

In order to better understand the operation of system 500, FIG. 5 is described with respect to FIG. 6. FIG. 6 shows a flowchart 600 of a process for selecting model features, in accordance with an example embodiment. In accordance with an embodiment, system 500 of FIG. 5 operates according to flowchart 600. Not all steps of flowchart 600 need be performed in all embodiments. Further structural and operational embodiments will be apparent to persons skilled in the relevant art(s) based on the following descriptions of FIGS. 5 and 6.

Flowchart 600 begins with step 602. In step 602, telemetry data describing user behavior with respect to a software application is received. For example, ML model trainer 128 of FIG. 5 receives telemetry data 504 from telemetry monitoring system 104. Telemetry data 504 comprises any time of telemetric data described elsewhere herein. In accordance with an embodiment, telemetry data 504 is application-specific (e.g., pertains to application 118 and/or other instances of application 118). In accordance with an embodiment, telemetry data 504 comprises a set of model features denoted as $f=\{f\_1, f\_2, \ldots, f\_n\}$, where "n" is the number of model features related to application 118. In a further embodiment, each feature is endowed with a set of respective textual descriptions $t=\{t\_1, t\_2, \ldots, t\_n\}$. Each textual description gives context about the corresponding feature and their purpose. In some embodiments, textual descriptions are augmented with developer notes (e.g., by a development user utilizing developer application 120 to modify the textual description). In some embodiments, textual descriptions are generated from product and/or program management documentation for the feature and/or application.

In step 604, the received telemetry data is utilized to train a ML model to predict user behavior with respect to the software application. For example, ML model trainer 128 of FIG. 5 utilizes telemetry data 504 to train ML model 130 to predict user behavior with respect to application 118. In embodiments, ML model trainer 128 trains ML model 130 utilizing supervised, unsupervised, or a combination of supervised and unsupervised techniques. For instance, in a non-limiting example, ML model trainer 128 trains ML model 130 utilizing a supervised learning technique to predict the likelihood of user retention. In accordance with an embodiment, the likelihood of user retention is equal to 1−churn, where "churn" is the likelihood of the user uninstalling, unsubscribing from, or otherwise no longer utilizing the application. In accordance with an embodiment, a user is considered to no longer be utilizing the application if a time of inactivity surpasses an inactive threshold (e.g., a week of inactivity, a month of inactivity, multiple months of inactivity, etc.). In the supervised learning example, the inputs of the ML model are any of type of model feature described herein (e.g., the last time a user utilized the application, how many times an action was performed utilizing the application, etc.) and predictions associated with a user churning are labeled as "churned" data. In a further example, the ML model is also trained where predictions associated with a user not churning are labeled as "retained". In this context, a user is considered retained if they continue utilizing the application for a predetermined time (e.g., in 1 month, in thirty days, in a number of months, a year, etc.) or after a certain event (e.g., after an update is made to the application, after a feature is added to the application, after a feature is removed from the application, after a competing application is launched, etc.). By training a ML model to predict user behavior based on telemetric data in this manner, system 500 provides quantitative data points usable by a prioritization system (e.g., SDP system 108) to prioritize software development items. In some embodiments, the quantitative data points (e.g., the model features) represent analysis of user behavior across many users (e.g., an entire customer base for a service). In this context, system 500 causes SDP system 108 to prioritize development items in a manner that considers a large amount of data (e.g., telemetry across tens, hundreds, thousands, and even greater numbers of users, wherein the telemetry comprises tens, hundreds, thousands, and even greater number of features per user in a given period of time). In accordance with an embodiment, ML model 130 is referred to as a "base ML model." In other words, some embodiments utilizing ML model 130 consider ML model 130 the base for quantitative data usable by SDP system 108.

In step 606, a set of model features are received from the ML model trained to predict user behavior. For example, feature extractor 502 of FIG. 5 receives set of model features 508 from ML model 130. In accordance with an embodiment, set of model features 508 are received as a list of tuples (f_i, s_i), where each feature f_i is assigned a global feature importance score, s_i. The global feature importance score of a feature reflects the level of influence the feature has over predictions made by model 130 (e.g., the level of influence the feature has over predicted user behavior). In examples, features that are positively correlated with the target of model 130 receive high positive scores whereas features that are negatively correlated with the target of model 130 receive high negative scores. Features with scores close to zero (either negative or positive) are considered to have a low impact on predictions made by model 130. In implementations, various techniques are used to obtain the global feature importance scores including, but not limited to, permutation testing techniques, Shapley additive explanation (SHAP) techniques, and others. In accordance with an embodiment, a global feature importance vector is extracted from set of model features 508. For instance, continuing the example described with respect to step 602, a global feature importance vector s={s_1, s_2, . . . , s_n} is extracted.

In step 608, the first and second model features are selected from the set of model features based on selection criteria. For example, feature extractor 502 selects model features 206 from set of model features based on selection criteria. In examples, selection criteria specifies one or more thresholds or other requirements a model feature is to satisfy to be selected. In accordance with an embodiment, selection criteria specifies a threshold as a minimum magnitude a global feature importance score is to satisfy in order for the model feature to be considered. In an alternative embodiment, feature extractor 502 selects a predetermined number of features (e.g., the n model features with the highest (e.g., magnitude of) global feature importance scores). In another alternative embodiment, feature extractor 502 selects the top percentage of model features. In examples, selection criteria is determined (e.g., hard coded) by a development user utilizing developer application 120. As a non-limiting example, suppose feature extractor 502 determines the number of times a user logs into an application in a week correlates to the likelihood of user retention. In this context "the number of times a user logs into an application" is a model feature and feature extractor 502 determines the feature satisfies selection criteria (e.g., the global feature importance of the model feature satisfies a threshold).

In accordance with an embodiment, model features are selected based on a level of positive and/or negative influence the model feature has on user retention. For instance, with continued reference to the example described with respect to the foregoing steps, feature extractor 502 selects nf features. In embodiments, nf is any number of features selected that have an influence on user retention that satisfies selection criteria (e.g., ones, tens, hundreds, or even greater numbers). In a non-limiting example where nf is greater than two, the number of selected features are denoted as fs={fs_1, fs_2, . . . , fs_nf}.

By selecting features in this manner, prioritization is focused on features that are "most impactful" to user retention, thereby reducing the number of features a prioritization system has to consider when prioritizing a software development item. This reduction in items for consideration reduces compute resources and reduces the chance of prioritizing a software development item based on a model feature that has little impact on user retention (which could result in efficient software development). In other words, selection of impactful features in this manner increases efficiency of development of software applications in terms of time spent and compute resources utilized. Furthermore, as embodiments rely on user behavior observed by telemetry monitoring system 106, prioritization of software development items, in some implementations, is performed without requiring relying on human decisions to infer importance or subjective techniques. In this manner, the impact of human bias (e.g., of the product owner or development team) can be removed or reduced from software development prioritization.

In some embodiments, since model features that are not expected to impact user retention are not used in prioritizing software development items, SDP system 108 de-prioritizes software development items that are unlikely to impact user retention (i.e., software development items that are related to non-impactful model features more than impactful model features). In accordance with a further embodiment, SDP system 108 and/or developer application 120 deprioritizes software development tasks related to deprioritized software development items associated with model features that are not impactful (e.g., wherein those tasks are not related to prioritized software development items). Furthermore, in a non-limiting example, SDP system 108 and/or developer application 120 determines a de-prioritized software development item should not be performed, as it is unlikely to impact on user retention. In this context, the number of unnecessary and/or bloated application features of application 118 are reduced, enabling application 118 to run more efficiently and utilize less memory of the executing computing device (e.g., computing device 102).

Embodiments of similarity determiners (e.g., similarity determiner 124) are configured in various ways to determine similarities between software development items and model features. For example, FIG. 7 shows a block diagram of a system 700 for determining a similarity between a software development item and a model feature, in accordance with an example embodiment. As shown in FIG. 7, system 700 comprises similarity determiner 124, as described with respect to FIG. 1, and an embedding model 702. As also shown in FIG. 7, similarity determiner 124 comprises an embedding model interface 704 and an embedding evaluator 706, each of which are subservices/subcomponents of similarity determiner 124. Embedding model interface 704 is configured to interact with embedding model 702 and embedding evaluator 706 is configured to determine similarities between embeddings generated by embedding model 702.

Embedding model 702 is a model configured to generate embeddings for use in machine learning. The embeddings generated by embedding model 702 are information dense representations of semantic meaning of an input (e.g., a piece of text). For instance, in accordance with an embodiment, an embedding is a vector of floating-point numbers such that the distance between two embeddings in vector space is correlated with semantic similarity between two inputs in their original format (e.g., text format). As an example, if two texts are similar, their vector representations should also be similar. In this manner, embeddings generated by embedding model 702 provide representation of data usable by systems described herein for performing various functions associated with data represented by embeddings. For instance, embedding evaluator 706 in accordance with an embodiment utilizes embeddings to determine similarities between software development items and model features. In accordance with an embodiment, embedding model 702 is a separate model from LLM 132 of FIG. 1. Alternatively, embedding model 702 is LLM 132.

To better understand the operation of system 700, FIG. 7 is described with respect to FIG. 8. FIG. 8 shows a flowchart of a process for determining a similarity between a software development item and a model feature, in accordance with an example embodiment. In accordance with an embodiment, similarity determiner 124 of FIG. 7 operates according to flowchart 800. Not all steps of flowchart 800 need be performed in all embodiments. Further structural and operational embodiments will be apparent to persons skilled in the relevant art(s) based on the following descriptions of FIGS. 7 and 8.

Flowchart 800 begins with step 802. In step 802, the first and second software development items and the first and second model features are provided to an embedding model. For example, embedding model interface 704 of FIG. 7 provides software development items 218 and feature summaries 216 (representative of model features 206) to embedding model 702. As shown in FIG. 7, embedding model interface 704 generates a prompt 708 and a prompt 710. Prompt 708 causes embedding model 702 to generate feature embeddings describing a context of model features 206 based on feature summaries 216 and prompt 710 causes embedding model 702 to generate development item embeddings based on development items 218. In an alternative embodiment, separate prompts are provided to embedding model 702 for each model feature of model features 206 and each software development item of software development items 218. In accordance with another alternative embodiment, prompts 708 and 710 are provided as a single prompt to embedding model 702.

In step 804, development item embeddings describing a context of the first and second development items and feature embeddings describing a context of the first and second model features are received from the embedding model. For example, embedding evaluator 706 of FIG. 7 receives feature embeddings 712 describing a context of model features 206 and development item embeddings 714 describing a context of development items 218. In embodiments, feature embeddings 712 and development item embeddings 714 are vectors of floating point numbers.

In step 806, similarities between the development item embeddings and the feature embeddings are determined. For example, embedding evaluator 706 determines similarities 220 between feature embeddings 712 and development item embeddings 714. Embedding evaluator 706 determines similarities 220 in various ways, in embodiments. For instance, in accordance with an embodiment, embedding evaluator 706 determines similarities 220 by measuring the distance between each development item embedding and feature embedding in vector space. Example methods for measuring similarity between embeddings include, but are not limited to, cosine-similarity, Euclidean distance similarity, dot product similarity, Jaccard similarity, Levenshtein similarity, and/or any other technique suitable for measuring similarity between embeddings. As described elsewhere herein, in some embodiments, similarity determiner 124 determines similarities 220 as similarity scores indicating how similar a development item is to a particular model feature. In an implementation of such an embodiment, the similarity score is the measurement made by embedding evaluator 706. Alternatively, embedding evaluator 706 scales the measurement to determine the score.

Embodiments of SDP system 108 generate prioritization data 222 in various ways. For instance, in some embodiments, SDP system 108 (or a component thereof) generates a matrix of scores representing respective similarities between development items and model features (also referred to as an "affinity matrix" herein). In implementations, the affinity matrix is utilized to determine prioritization data 222. SDP system 108 operates in various ways to generate and utilize affinity matrices, in implementations. For instance, FIG. 9 shows a flowchart 900 of a process for prioritizing software development, in accordance with an example embodiment. In accordance with an embodiment, SDP system 108 of FIG. 2 operates according to flowchart 900. Not all steps of flowchart 900 need be performed in all embodiments. Further structural and operational embodiments will be apparent to persons skilled in the relevant art(s) based on the following description of FIG. 9 with respect to FIG. 2.

Flowchart 900 begins with step 902, which is a further example of step 308 of flowchart 300 of FIG. 3. In step 902 an affinity matrix comprising a first grouping of data corresponding to the first software development item, a second grouping of data corresponding to the second software development item, a third grouping of data corresponding to the first model feature, and a fourth grouping of data corresponding to the second model feature is generated, wherein values in the affinity matrix comprise a score representing a respective similarity of the determined similarities. For example, similarity determiner 124 of FIG. 2 generates an affinity matrix comprising a groups of data corresponding to software development items of software development items 218 and groups of data corresponding to model features of model features 206. In accordance with an embodiment, the groupings of data corresponding to software development items is in a first dimension and the groupings of data corresponding to the model features are in a second dimension. For instance, in accordance with an embodiment, the affinity matrix has a dimensionality of np×nf where np is the number of development items and nf is the number of model features similarities were determined for. As described with respect to FIG. 5, nf is any number of features selected that have an influence on user retention that satisfies selection criteria. Furthermore, np is any number of software development items to be prioritized (e.g., one, ones, tens, hundreds, or even greater numbers). In a non-limiting example where np is greater than two, the number of software development items are denoted as $p=\{p\_1, p\_2, \ldots, p\_pnp\}$.

In order to better understand the process described with respect to flowchart 900, FIG. 10 is described herein. FIG. 10 shows an example table representative of an affinity matrix 1000 ("table 1000" and "Matrix K" herein), in accordance with an example embodiment. Table 1000 comprises a set of nf columns and np rows, where nf is the number of model features Matrix K was generated for and np is the number of software development items Matrix K was generated for. In FIG. 10, columns are labeled "fs_1" for a first model feature, "fs_2" for a second model feature, and "fs_nf" for an nfth model feature and rows are labeled "p_1" for a first software development item, "p_2" for a second software development item, and "p_np" for an npth software development item. Each cell of table 1000 includes a value comprising a score representing a similarity between a corresponding model feature and software development, "S(m, n)" where m is the software development item and n is the model feature. For instance, S(p_1, fs_1) is the similarity score representing the similarity between software development item p_1 and model feature fs_1. In some embodiments, Matrix K is generated and/or stored as a table similar to table 1000. Alternatively, Matrix K is generated without column and/or row labels (e.g., as a matrix comprising only scores). As shown in FIG. 10, each row of table 1000 corresponds to a software development item and each column of table 1000 corresponds to a model feature; however, in an alternative embodiment, each row of Matrix K corresponds to a model feature and each column of the affinity matrix corresponds to a software development item.

Continuing to the description of flowchart 900 of FIG. 9, steps 904 and 906 are described as follows. Steps 904 and 906 are further examples of step 310 of flowchart 300 of FIG. 3. In step 904, singular value decomposition is performed on the affinity matrix to determine a first singular value and a second singular value, the first singular value having a corresponding first singular vector comprising a linear combination of importance of the first and second software development items to the first singular vector. For example, prioritizer 126 of FIG. 2 performs singular value decomposition on the affinity matrix generated in step 902 to determine first and second singular values. In embodiments, the first singular value has a corresponding first singular vector comprising a linear combination of importance of the first and second software development items to the first singular vector. In accordance with a further embodiment, the second singular value (and the nth singular value) has a corresponding second (nth) singular vector comprising a linear combination of importance of the first and second software development items to the second (nth) singular vector. By performing singular value decomposition on the affinity matrix in this manner, prioritizer 126 efficiently considers important features in prioritization of software development items.

To better understand the operation of prioritizer 126 performing step 904, consider the running example described with respect to Matrix K. In this example, suppose singular value decomposition is utilized to factorize Matrix K such that:

$$K=USV^*$$

where U is a rotation matrix with dimensions np×np, V is a rotation matrix with dimensions nf×nf, and S is a regular diagonal (e.g., rescaling) matrix with non-negative real numbers on the diagonal and dimensions np×nf. The "*" in V* denotes that it is a conjugate transpose of V. The non-negative real numbers of S are referred to as singular values. In an embodiment, an ordered list of the singular values of Matrix K is denoted as $[sk\_1, sk\_2, \ldots sk\_n]$ with $sk\_1>sk\_2> \ldots >sk\_n$. The highest singular values correspond to the most influential patterns that explain most of the variance of data in components of Matrix K. The lower singular values capture less significant patterns with diminishing explanatory power as approaching the nth singular value. Each singular value is associated with left (resp. right) singular vectors which are encoded as the columns of U (resp. V). In examples, singular vectors are orthonormal vectors also regarded as "basis vectors."

U spans the space of software development items. The columns of U provide a set of np singular vectors that are ordered as $[sv\_1, sv\_2, \ldots, sv\_n]$. In this context, the np singular vectors are ordered such that the first singular vector sv_1 is associated with singular value sk_1 (e.g., the most dominant singular vector of Matrix K), the second singular vector sv_2 is associated with singular value sk_2, etc. In examples, each singular vector of U can be denoted as "sv_i" and expressed as a linear combination:

$$sv\_i=(ai\_1{\times}p\_1)+(ai\_2{\times}p\_2)+ \ldots +(ai\_np{\times}p\_np)$$

where coefficients ai_1, ai_2, . . . , ai_np encode the importance of each software development item p_1, p_2, . . . , pi_np to the i'th singular vector.

In step 906, the first software development item is prioritized based on the first and second singular values. For example, prioritizer 126 of FIG. 2 prioritizes one or more software development items based on the first and second singular values determined in step 904. In embodiments, prioritizer 126 performs various transformations and ranking functions in order to prioritize software development items based on singular values. Additional details regarding prioritization of software development items based on singular vectors are described further with respect to FIGS. 11 and 12, as well as elsewhere herein.

In examples, prioritizer 126 operates in various ways to prioritize software development items based on singular values. For instance, FIG. 11 shows a flowchart 1100 of a process for prioritizing software development, in accordance with another example embodiment. In accordance with an embodiment, prioritizer 126 of FIG. 2 operates according to flowchart 1100. In accordance with an embodiment, flowchart 1100 is a further embodiment of step 906 of flowchart 900, as described with respect to FIG. 9. Not all steps of flowchart 1100 need be performed in all embodiments. Further structural and operational embodiments will be apparent to persons skilled in the relevant art(s) based on the following description of FIG. 11 with respect to FIG. 2.

Flowchart 1100 begins with step 1102. In step 1102, coefficients of the first and second singular vectors are transformed. For example, prioritizer 126 of FIG. 2 transforms coefficients of singular vectors determined in step 904 of flowchart 900 of FIG. 9. In embodiments, prioritizer 126 transforms coefficients in order to apply a weight to coefficients based on impact of associated singular values, treat negative and positive coefficients equally, and/or otherwise improve consideration of coefficients of singular vectors in determining a prioritization score, as described herein. Additional details regarding transforming coefficients of singular vectors are described with respect to FIG. 12, as well as elsewhere herein.

In step 1104, a prioritization score for the first software development item is determined based on a first component of the first singular vector corresponding to the first software development item and a second component of the second singular vector corresponding to the first software development item, the first component comprising a coefficient of the first singular vector corresponding to the first software development item and the second component comprising a coefficient of the second singular vector corresponding to the first software development item. For example, prioritizer 126 of FIG. 2 determines prioritization scores for software development items 218 based on respective components of singular vectors, each component of a singular vector comprising a coefficient of the singular vector corresponding to the software development item. In embodiments, the prioritization scores are included in prioritization data 222. An illustrative example of determining a prioritization score from components of singular vectors is described further below with respect to FIG. 12.

In step 1106, the first software development item is prioritized based on the prioritization score. For example, prioritizer 126 of FIG. 2 prioritizes a software development item (e.g., over other software development items of software development items 218) based on prioritization scores determined in step 1104. In accordance with an embodiment, prioritizer 126 prioritizes software development items by performing a ranking operation on a vector comprising the prioritization scores to generate an ordered list of software development items. In accordance with an embodiment, prioritization data 222 indicates an order in which software development items are to be prioritized based on prioritization scores.

In examples, prioritizer 126 operates in various ways to transform coefficients of singular vectors. For example, FIG. 12 shows a flowchart 1200 of a process for transforming coefficients of singular vectors, in accordance with an example embodiment.

In accordance with an embodiment, prioritizer 126 of FIG. 2 operates according to flowchart 1200. Not all steps of flowchart 1200 need be performed in all embodiments. Further structural and operational embodiments will be apparent to persons skilled in the relevant art(s) based on the following description of FIG. 12 with respect to FIGS. 2, 9, and 11.

Flowchart 1200 begins with step 904 of flowchart 900 of FIG. 9. In step 904, singular value decomposition is performed on an affinity matrix, as described elsewhere herein and flowchart 1200 continues to step 1202, step 1204, and/or step 1206.

Steps 1202, 1204, and 1206 are further examples of step 1102 of flowchart 1100 of FIG. 11. In steps 1202, 1204, and 1206, coefficients of singular vectors are transformed. For instance, in step 1202, an absolute value transformation is applied to the coefficients of the first and second singular vectors. For example, prioritizer 126 of FIG. 2 applies an absolute value transformation to the coefficients of first and second singular vectors. An example of an absolute value transformation is as follows:

$$g(ai\_j)=|ai\_j|$$

where g(x) is the transformation function, and i denotes the singular vector and j denotes the software development item.

Alternative to, or in addition to step 1202, step 1204 is performed. In step 1204, a squaring transformation is applied to the coefficients. For example, prioritizer 126 of FIG. 2 applies a squaring transformation to the coefficients of first and second singular vectors. An example of a squaring transformation is as follows:

$$g(ai\_j)=ai\_j^2$$

where, in this context, g(x) is the transformation function, and i denotes the singular vector and j denotes the software development item.

In some examples, embodiments of prioritizer 126 perform step 1202 and/or step 1204 to consider positive and negative coefficients equally. In this context, coefficients that strongly contribute to a single vector (i.e., have a value that is not close to 0 relative to the maximum value of a coefficient and/or a threshold condition). In either case, each coefficient of a singular vector is transformed to result in the following transformed coefficient vector ais:

$$ais=[g(ai\_1),g(ai\_2), \ldots ,g(ai\_np)]$$

In step 1206, a scale transformation is applied to the coefficients based on a measure of importance the corresponding singular value has in varying the determined similarities. For example, prioritizer 126 of FIG. 2 applies a scale transformation to the coefficients based on a measure of importance a corresponding singular value has in varying a determined similarity. In this context, a singular vector is scaled by the impact an associated singular value has in the variance of initial data (e.g., such that singular vectors associated with singular values with a higher impact on the data are scaled by a factor higher than singular vectors associated with singular values with a lower impact on the data). Prioritizer 126 operates to scale coefficients based on singular values in various ways, in embodiments. For instance, prioritizer 126 in accordance with an embodiment scales on the following function h(sk_i, ai_j):

$$h(sk\_i,ai\_j)=[sk\_i×ai\_1,sk\_i×ai\_2, \ldots ,sk\_i×ai\_np]$$

where, in this context, sk_i is the singular value for the singular vector i and ai_j are the coefficients for singular vector i.

As shown in FIG. 12, subsequent to performance of step 1202, 1204, or 1206, flowchart 1200 continues to step 1104 of flowchart 1100, as described with respect to FIG. 11; however, embodiments described herein are not so limited. For instance, in accordance with an embodiment, two or more of steps 1202, 1204, and 1206 are performed prior to step 1104. For instance, as a non-limiting example, the transformation described with respect to step 1202 and/or step 1204 are applied to the coefficients and (e.g., subsequently) the transformation described with respect to step 1206 is applied to the transformed coefficients. In order to better understand embodiments utilizing multiple transformations, consider the non-limiting example described with respect to Matrix K of FIG. 10. Further suppose the coefficients of singular vectors of Matrix K are first transformed (e.g., utilizing techniques described with respect to step 1202 and/or step 1204 of flowchart 1200) to generate transformed coefficient vector ais. Further suppose techniques described with respect to step 1206 are utilized to transform vector ais to the scaled coefficient vector bis denoted as:

$$bis=[sk\_i*g(ai\_1),sk\_i*g(ai\_2), \ldots ,sk\_i*g(ai\_np)]$$

In this context, scaled coefficient vector bis represents coefficients of a singular vector transformed to consider positive and negative coefficients and to scale vectors according to associated singular values. With continued reference to Matrix K of FIG. 10, the scaled coefficient vectors for Matrix K are determined as:

$$b1s=[sk\_1*g(a1\_1),sk\_1*g(a1\_2), \ldots ,sk\_1*g(a1\_np)]$$

$$b2s=[sk\_2*g(a2\_1),sk\_2*g(a2\_2), \ldots ,sk\_2*g(a2\_np)]$$

$$bnps=[sk\_np*g(anp\_1),sk\_np*g(anp\_2), \ldots ,sk\_np*g(anp\_np)]$$

Thus, an example of transforming coefficients of singular vectors has been described with respect to Matrix K of FIG. 10 and steps of flowchart 1200. With continued reference to the scaled coefficient vectors bls, b2s, . . . , bnps, some embodiments of prioritizer 126 utilize the scaled coefficient vectors to determine prioritization scores (e.g., in a manner described with respect to step 1104 of flowchart 1100). For instance, in accordance with an embodiment, prioritizer 126 defines prioritization scores for software development items as:

$$score(p\_1)=[sk\_1*g(a1\_1)+sk\_2*g(a2\_1)+ \ldots +sk\_np*g(anp\_1)]$$

$$score(p\_2)=[sk\_1*g(a1\_2)+sk\_2*g(a2\_2)+ \ldots +sk\_np*g(anp\_2)]$$

$$score(p\_np)=[sk\_1*g(a1\_np)+sk\_2*g(a2\_np)+ \ldots +sk\_np*g(anp\_np)]$$

where score (p_1) is a prioritization score for software development item p_1, score (p_2) is a prioritization score for software development item p_2, and score (p_np) is a prioritization score for software development item p_np. In this context, each prioritization score is the sum of components of the scaled coefficient vectors that are associated with the corresponding software development item. In order to prioritize the software development items (e.g., as described with respect to step 1106 of flowchart 1100), prioritizer 126 ranks the prioritization scores. In accordance with an embodiment, a rank function is utilized to rank the scores as follows:

$$\text{Prioritized List of Software Development Items}=Rank[score(p\_1),score(p\_2), \ldots score(p\_np)]$$

Thus, an illustrative example of prioritizing software development items has been described with respect to Matrix K of FIG. 10 and the steps of flowchart 1100 of FIG. 11 and flowchart 1200 of FIG. 12. By performing singular value decomposition, transforming coefficients, and determining scores in this manner, embodiments of SDP system 108 efficiently consider model features that have a (e.g., relatively) high impact in user retention. In this context, techniques described herein provide efficient prioritization of software development, thereby reducing redundancies and increasing the impact of software development tasks on performance of software and retention of users.

III. Additional Embodiments

A. Augmenting Qualitative Prioritization

As described herein, embodiments of the prioritization systems described herein enable prioritization of software development items based on quantitative data points without relying on qualitative techniques. In some embodiments, the quantitative prioritization techniques described herein are used in combination with qualitative techniques. In this context, embodiments described herein enable augmented "qualitative prioritization", or prioritization based on qualitative techniques augmented by quantitative prioritization. For instance, as a non-limiting example of this alternative embodiment, suppose a product owner utilizes qualitative techniques (such as surveys or customer interviews) to determine a subset of software development items should be prioritized. In this context, the development team utilizes the quantitative techniques described herein (e.g., with respect to SDP system 108) to determine an order in which the subset of software development items are to be prioritized. In this context, quantitative prioritization is used to provide additional insight to qualitative prioritization techniques. In another non-limiting example of this alternative embodiment, suppose SDP system 108 is utilized to prioritize software development items. In this context, the product owner and/or development team further prioritizes the top n (e.g., the top 3, the top 5, the top 10, and/or the like) prioritized software development items utilizing qualitative techniques. In this context, qualitative prioritization techniques can be used to further differentiate which of the top n prioritized software development items should be addressed first. For instance, suppose the top-most prioritized software development item and the second top-most prioritized software development item are close in prioritization scores. In this scenario, a development team can utilize qualitative prioritization techniques to further differentiate the prioritization scores from one another. Furthermore, in some embodiments, SDP system 108 (or a component thereof, e.g., prioritizer 126) is configured to flag prioritization scores that are close to one another in magnitude (e.g., the difference between the prioritization scores falls below a threshold). In this context, a development team is alerted to areas that may benefit from further (e.g., qualitative) consideration.

B. Additional Factor Considerations

As described herein, embodiments of the prioritization systems described herein enable prioritization of software development items based on quantitative data points with respect to user behavior. In some embodiments, additional factors for prioritizing a software development item over another software development item are used. For instance, some implementations of SDP systems described herein consider factors such as monetary cost to perform a software development task with respect to a software development item, time required to perform a software development task with respect to a software development item, personnel required to perform a software development task with respect to a software development item, and/or other factors in addition to the quantitative data points with respect to user behavior. In some implementations, prioritizer 126 applies a weight to software development items based on these other factors prior to generation of prioritization data.

C. Hardware Device Telemetry

Embodiments of feature summarizers, similarity determiners, and prioritizers have been described herein with respect to prioritization of software development items based on model features related to telemetry regarding user behavior of a software application. However, it is also contemplated herein that some embodiments of software development prioritization utilize telemetry regarding an end-user's interaction with hardware devices and/or hardware devices used to execute a software application. Such telemetry includes the computing device an end-user is utilizing (e.g., computing device 102 of FIG. 1), an operating system of the computing device, hardware accelerators available to the computing device (e.g., graphics processing units (GPUs), neural processing units (NPUs), and/or other hardware accelerator devices), and/or any of the other types of telemetric data or information described herein. In this context, SDP system 108 receives model features related to hardware devices, model features related to software telemetry, and/or model features related to hardware and software telemetry.

As a non-limiting example, suppose ML model trainer 128 in this alternative embodiment trains ML model 130 to predict user retention based on telemetry data comprising hardware telemetry. Further suppose feature extractor 502 selects a model feature of ML model 130 that satisfies selection criteria and is related to the hardware telemetry. In this non-limiting example, SDP system 108 summarizes the model features, determines software development items that are similar to the model features, and prioritizes software development items based on determined similarities utilizing techniques similar to those described elsewhere herein. In this context, SDP system 108 considers details related to hardware utilized by users in determining which software development items to prioritize. By considering hardware telemetry, SDP system 108 leverages additional insight in prioritization of software development items and/or software development tasks. For instance, SDP system 108 in accordance with an example implementation determines development of a software feature that leverages a GPU should be prioritized based on the impact utilizing a GPU has on user retention. Furthermore, some implementations of such embodiments are utilized to prioritize development of a dedicated hardware chip that implements a software development item.

D. Hardware Development Prioritization

Embodiments of systems, methods, and apparatuses for prioritizing the development of software have been described herein. However, in an alternative aspect of the present disclosure, techniques described herein are utilized to develop hardware devices and/or components. In this context, telemetry data includes information related to hardware devices of users, previous hardware devices of users, and/or user behavior with respect to software applications. Embodiments of prioritization systems utilized to prioritize development of hardware are also referred to as hardware development prioritization (HDP) systems or a combination hardware and software development prioritization (HSDP) system. In this context, the prioritization system receives model features related to hardware devices, software telemetry, and/or a combination of software and hardware telemetry.

As a non-limiting example, suppose ML model trainer 128 in this alternative embodiment trains ML model 130 to predict user retention based on telemetry data related to a user's previous usage of hardware devices, components that comprise the hardware device (e.g., in a personal computing device, the motherboard, the processor, accelerators, memory devices, and other hardware components of the personal computing device), peripheral devices utilized in conjunction with the hardware device, components a user has disabled on the hardware device, software that leverages dedicated hardware chips that the user interacts with (e.g., software leveraging a GPU), and other telemetry related to the particular hardware utilized by a user. Further suppose feature extractor 502 selects a model feature of ML model 130 that satisfies selection criteria, in a similar manner as described elsewhere herein. In this non-limiting example, the prioritization system summarizes the selected model features, determines similarities between the model features and development items (e.g., hardware development items), and prioritizes hardware development items based on determined similarities utilizing techniques similar to those described elsewhere herein with respect to software development item prioritization. In this context, HDP and/or HSDP systems provide insight in which hardware devices and/or components should be developed in order to increase the likelihood of retaining users. Thus, hardware development tasks can be prioritized in an efficient manner.

IV. Example Computer System Implementation

Each of computing device 102, computing device 104, telemetry monitoring system 106, SDP system 108, ML model server 110, AI model server 112, storage 114, system 200, system 500, system 700, and/or components described therein are implemented in hardware, or hardware combined with one or both of software and/or firmware. For example, application 118, developer application 120, feature summarizer 122, similarity determiner 124, prioritizer 126, ML model trainer 128, ML model 130, LLM 132, feature extractor 502, embedding model 702, and/or each of the components described therein, and/or the steps of flowcharts 300, 400, 600, 800, 900, 1100, and/or 1200 are each implemented as computer program code/instructions configured to be executed in one or more processors and stored in a computer readable storage medium. Alternatively, application 118, developer application 120, feature summarizer 122, similarity determiner 124, prioritizer 126, ML model trainer 128, ML model 130, LLM 132, feature extractor 502, embedding model 702, and/or each of the components described therein, and/or the steps of flowcharts 300, 400, 600, 800, 900, 1100, and/or 1200 are each implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 13. FIG. 13 shows a block diagram of an exemplary computing environment 1300 that includes a computing device 1302. Computing device 1302 is an example of computing device 102, computing device 104, telemetry monitoring system 106, SDP system 108, ML model server 110, and/or AI model server 112, which each include one or more of the components of computing device 1302. In some embodiments, computing device 1302 is communicatively coupled with devices (not shown in FIG. 13) external to computing environment 1300 via network 1304. In accordance with an embodiment, network 1304 is an example of network 116 of FIG. 1. Network 1304 comprises one or more networks such as local area networks (LANs), wide area networks (WANs), enterprise networks, the Internet, etc. In examples, network 1304 includes one or more wired and/or wireless portions. In some examples, network 1304 additionally or alternatively includes a cellular network for cellular communications. Computing device 1302 is described in detail as follows.

Computing device 1302 can be any of a variety of types of computing devices. Examples of computing device 1302 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1302 is a stationary computing device such as a desktop computer, a personal computer (PC), a stationary server device, a minicomputer, a mainframe, a supercomputer, etc.

As shown in FIG. 13, computing device 1302 includes a variety of hardware and software components, including a processor 1310, a storage 1320, a graphics processing unit (GPU) 1342, a neural processing unit (NPU) 1344, one or more input devices 1330, one or more output devices 1350, one or more wireless modems 1360, one or more wired interfaces 1380, a power supply 1382, a location information (LI) receiver 1384, and an accelerometer 1386. Storage 1320 includes memory 1356, which includes non-removable memory 1322 and removable memory 1324, and a storage device 1388. Storage 1320 also stores an operating system 1312, application programs 1314, and application data 1316. Wireless modem(s) 1360 include a Wi-Fi modem 1362, a Bluetooth modem 1364, and a cellular modem 1366. Output device(s) 1350 includes a speaker 1352 and a display 1354. Input device(s) 1330 includes a touch screen 1332, a microphone 1334, a camera 1336, a physical keyboard 1338, and a trackball 1340. Not all components of computing device 1302 shown in FIG. 13 are present in all embodiments, additional components not shown may be present, and in a particular embodiment any combination of the components are present. In examples, components of computing device 1302 are mounted to a circuit card (e.g., a motherboard) of computing device 1302, integrated in a housing of computing device 1302, or otherwise included in computing device 1302. The components of computing device 1302 are described as follows.

In embodiments, a single processor 1310 (e.g., central processing unit (CPU), microcontroller, a microprocessor, signal processor, ASIC (application specific integrated circuit), and/or other physical hardware processor circuit) or multiple processors 1310 are present in computing device 1302 for performing such tasks as program execution, signal coding, data processing, input/output processing, power control, and/or other functions. In examples, processor 1310 is a single-core or multi-core processor, and each processor core is single-threaded or multithreaded (to provide multiple threads of execution concurrently). Processor 1310 is configured to execute program code stored in a computer readable medium, such as program code of operating system 1312 and application programs 1314 stored in storage 1320. The program code is structured to cause processor 1310 to perform operations, including the processes/methods disclosed herein. Operating system 1312 controls the allocation and usage of the components of computing device 1302 and provides support for one or more application programs 1314 (also referred to as "applications" or "apps"). In examples, application programs 1314 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1310 includes one or more general processors (e.g., CPUs) configured with or coupled to one or more hardware accelerators, such as one or more NPUs 1344 and/or one or more GPUs 1342.

Any component in computing device 1302 can communicate with any other component according to function, although not all connections are shown for ease of illustration. For instance, as shown in FIG. 13, bus 1306 is a multiple signal line communication medium (e.g., conductive traces in silicon, metal traces along a motherboard, wires, etc.) present to communicatively couple processor 1310 to various other components of computing device 1302, although in other embodiments, an alternative bus, further buses, and/or one or more individual signal lines is/are present to communicatively couple components. Bus 1306 represents one or more of any of several types of bus structures, including a memory bus or memory controller, a peripheral bus, an accelerated graphics port, and a processor or local bus using any of a variety of bus architectures.

Storage 1320 is physical storage that includes one or both of memory 1356 and storage device 1388, which store operating system 1312, application programs 1314, and application data 1316 according to any distribution. Non-removable memory 1322 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1322 includes main memory and is separate from or fabricated in a same integrated circuit as processor 1310. As shown in FIG. 13, non-removable memory 1322 stores firmware 1318 that is present to provide low-level control of hardware. Examples of firmware 1318 include BIOS (Basic Input/Output System, such as on personal computers) and boot firmware (e.g., on smart phones). In examples, removable memory 1324 is inserted into a receptacle of or is otherwise coupled to computing device 1302 and can be removed by a user from computing device 1302. Removable memory 1324 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1388 are present that are internal and/or external to a housing of computing device 1302 and are or are not removable. Examples of storage device 1388 include a hard disk drive, a SSD, a thumb drive (e.g., a USB (Universal Serial Bus) flash drive), or other physical storage device.

One or more programs are stored in storage 1320. Such programs include operating system 1312, one or more application programs 1314, and other program modules and program data. Examples of such application programs include computer program logic (e.g., computer program code/instructions) for implementing application 118, developer application 120, feature summarizer 122, similarity determiner 124, prioritizer 126, ML model trainer 128, ML model 130, LLM 132, feature extractor 502, embedding model 702, and/or each of the components described therein, and/or the steps of flowcharts 300, 400, 600, 800, 900, 1100, and/or 1200, and/or any individual steps thereof.

Storage 1320 also stores data used and/or generated by operating system 1312 and application programs 1314 as application data 1316. Examples of application data 1316 include web pages, text, images, tables, sound files, video data, and other data. In examples, application data 1316 is sent to and/or received from one or more network servers or other devices via one or more wired or wireless networks. Storage 1320 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1302 through one or more input devices 1330 and receives information from computing device 1302 through one or more output devices 1350. Input device(s) 1330 includes one or more of touch screen 1332, microphone 1334, camera 1336, physical keyboard 1338 and/or trackball 1340 and output device(s) 1350 includes one or more of speaker 1352 and display 1354. Each of input device(s) 1330 and output device(s) 1350 are integral to computing device 1302 (e.g., built into a housing of computing device 1302) or are external to computing device 1302 (e.g., communicatively coupled wired or wirelessly to computing device 1302 via wired interface(s) 1380 and/or wireless modem(s) 1360). Further input devices 1330 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1354 displays information, as well as operating as touch screen 1332 by receiving user commands and/or other information (e.g., by touch, finger gestures, virtual keyboard, etc.) as a user interface. Any number of each type of input device(s) 1330 and output device(s) 1350 are present, including multiple microphones 1334, multiple cameras 1336, multiple speakers 1352, and/or multiple displays 1354.

In embodiments where GPU 1342 is present, GPU 1342 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1342 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1344 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1328. In an example, NPU 1344 is configured for a data-driven parallel computing and is highly efficient at processing massive multimedia data such as videos and images and processing data for neural networks. NPU 1344 is configured for efficient handling of AI-related tasks, such as speech recognition, background blurring in video calls, photo or video editing processes like object detection, etc.

In embodiments disclosed herein that implement ML models, NPU 1344 can be utilized to execute such ML models, of which MLM 1328 is an example. For instance, where applicable, MLM 1328 is a generative AI model (e.g., such as LLM 132 of FIG. 1) that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1344 is used to train MLM 1328. To train MLM 1328, training data is that includes input features (attributes) and their corresponding output labels/target values (e.g., for supervised learning) is collected. A training algorithm is a computational procedure that is used so that MLM 1328 learns from the training data. Parameters/weights are internal settings of MLM 1328 that are adjusted during training by the training algorithm to reduce a difference between predictions by MLM 1328 and actual outcomes (e.g., output labels). In some examples, MLM 1328 is set with initial values for the parameters/weights. A loss function measures a dissimilarity between predictions by MLM 1328 and the target values, and the parameters/weights of MLM 1328 are adjusted to minimize the loss function. The parameters/weights are iteratively adjusted by an optimization technique, such as gradient descent. In this manner, MLM 1328 is generated through training by NPU 1344 to be used to generate inferences based on received input feature sets for particular applications. MLM 1328 is generated as a computer program or other type of algorithm configured to generate an output (e.g., a classification, a prediction/inference) based on received input features, and is stored in the form of a file or other data structure.

In examples, such training of MLM 1328 by NPU 1344 is supervised or unsupervised. According to supervised learning, input objects (e.g., a vector of predictor variables) and a desired output value (e.g., a human-labeled supervisory signal) train MLM 1328. The training data is processed, building a function that maps new data on expected output values. Example algorithms usable by NPU 1344 to perform supervised training of MLM 1328 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1328 is an LLM, MLM 1328 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1328 is trained to learn patterns from unlabeled data. For instance, in embodiments where MLM 1328 implements unsupervised learning techniques, MLM 1328 identifies one or more classifications or clusters to which an input belongs. During a training phase of MLM 1328 according to unsupervised learning, MLM 1328 tries to mimic the provided training data and uses the error in its mimicked output to correct itself (i.e., correct weights and biases). In further examples, NPU 1344 perform unsupervised training of MLM 1328 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1344 need not necessarily be present in all ML model embodiments. In embodiments where ML models are present, any one or more of processor 1310, GPU 1342, and/or NPU 1344 can be present to train and/or execute MLM 1328.

One or more wireless modems 1360 can be coupled to antenna(s) (not shown) of computing device 1302 and can support two-way communications between processor 1310 and devices external to computing device 1302 through network 1304, as would be understood to persons skilled in the relevant art(s). Wireless modem 1360 is shown generically and can include a cellular modem 1366 for communicating with one or more cellular networks, such as a GSM network for data and voice communications within a single cellular network, between cellular networks, or between the mobile device and a public switched telephone network (PSTN). In examples, wireless modem 1360 also or alternatively includes other radio-based modem types, such as a Bluetooth modem 1364 (also referred to as a "Bluetooth device") and/or Wi-Fi modem 1362 (also referred to as an "wireless adaptor"). Wi-Fi modem 1362 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1364 is configured to communicate with another Bluetooth-capable device according to the Bluetooth short-range wireless technology standard(s) such as IEEE 802.15.1 and/or managed by the Bluetooth Special Interest Group (SIG).

Computing device 1302 can further include power supply 1382, LI receiver 1384, accelerometer 1386, and/or one or more wired interfaces 1380. Example wired interfaces 1380 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1380 of computing device 1302 provide for wired connections between computing device 1302 and network 1304, or between computing device 1302 and one or more devices/peripherals when such devices/peripherals are external to computing device 1302 (e.g., a pointing device, display 1354, speaker 1352, camera 1336, physical keyboard 1338, etc.). Power supply 1382 is configured to supply power to each of the components of computing device 1302 and receives power from a battery internal to computing device 1302, and/or from a power cord plugged into a power port of computing device 1302 (e.g., a USB port, an A/C power port). LI receiver 1384 is useable for location determination of computing device 1302 and in examples includes a satellite navigation receiver such as a Global Positioning System (GPS) receiver and/or includes other type of location determiner configured to determine location of computing device 1302 based on received information (e.g., using cell tower triangulation, etc.). Accelerometer 1386, when present, is configured to determine an orientation of computing device 1302.

Note that the illustrated components of computing device 1302 are not required or all-inclusive, and fewer or greater numbers of components can be present as would be recognized by one skilled in the art. In examples, computing device 1302 includes one or more of a gyroscope, barometer, proximity sensor, ambient light sensor, digital compass, etc. In an example, processor 1310 and memory 1356 are co-located in a same semiconductor device package, such as being included together in an integrated circuit chip, FPGA, or system-on-chip (SOC), optionally along with further components of computing device 1302.

In embodiments, computing device 1302 is configured to implement any of the above-described features of flowcharts herein. Computer program logic for performing any of the operations, steps, and/or functions described herein is stored in storage 1320 and executed by processor 1310.

In some embodiments, server infrastructure 1370 is present in computing environment 1300 and is communicatively coupled with computing device 1302 via network 1304. Server infrastructure 1370, when present, is a network-accessible server set (e.g., a cloud-based environment or platform). As shown in FIG. 13, server infrastructure 1370 includes clusters 1372. Each of clusters 1372 comprises a group of one or more compute nodes and/or a group of one or more storage nodes. For example, as shown in FIG. 13, cluster 1372 includes nodes 1374. Each of nodes 1374 are accessible via network 1304 (e.g., in a "cloud-based" embodiment) to build, deploy, and manage applications and services. In examples, any of nodes 1374 is a storage node that comprises a plurality of physical storage disks, SSDs, and/or other physical storage devices that are accessible via network 1304 and are configured to store data associated with the applications and services managed by nodes 1374.

Each of nodes 1374, as a compute node, comprises one or more server computers, server systems, and/or computing devices. For instance, a node 1374 in accordance with an embodiment includes one or more of the components of computing device 1302 disclosed herein. Each of nodes 1374 is configured to execute one or more software applications (or "applications") and/or services and/or manage hardware resources (e.g., processors, memory, etc.), which are utilized by users (e.g., customers) of the network-accessible server set. In examples, as shown in FIG. 13, nodes 1374 includes a node 1346 that includes storage 1348 and/or one or more of a processor 1358 (e.g., similar to processor 1310, GPU 1342, and/or NPU 1344 of computing device 1302). Storage 1348 stores application programs 1376 and application data 1378. Processor(s) 1358 operate application programs 1376 which access and/or generate related application data 1378. In an implementation, nodes such as node 1346 of nodes 1374 operate or comprise one or more virtual machines, with each virtual machine emulating a system architecture (e.g., an operating system), in an isolated manner, upon which applications such as application programs 1376 are executed.

In embodiments, one or more of clusters 1372 are located/ co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1372 are included in a datacenter in a distributed collection of datacenters. In embodiments, exemplary computing environment 1300 comprises part of a cloud-based platform.

In an embodiment, computing device 1302 accesses application programs 1376 for execution in any manner, such as by a client application and/or a browser at computing device 1302.

In an example, for purposes of network (e.g., cloud) backup and data security, computing device 1302 additionally and/or alternatively synchronizes copies of application programs 1314 and/or application data 1316 to be stored at network-based server infrastructure 1370 as application programs 1376 and/or application data 1378. In examples, operating system 1312 and/or application programs 1314 include a file hosting service client configured to synchronize applications and/or data stored in storage 1320 at network-based server infrastructure 1370.

In some embodiments, on-premises servers 1392 are present in computing environment 1300 and are communicatively coupled with computing device 1302 via network 1304. On-premises servers 1392, when present, are hosted within an organization's infrastructure and, in many cases, physically onsite of a facility of that organization. On-premises servers 1392 are controlled, administered, and maintained by IT (Information Technology) personnel of the organization or an IT partner to the organization. Application data 1398 can be shared by on-premises servers 1392 between computing devices of the organization, including computing device 1302 (when part of an organization) through a local network of the organization, and/or through further networks accessible to the organization (including the Internet). Furthermore, in examples, on-premises servers 1392 serve applications such as application programs 1396 to the computing devices of the organization, including computing device 1302. Accordingly, in examples, on-premises servers 1392 include storage 1394 (which includes one or more physical storage devices such as storage disks and/or SSDs) for storage of application programs 1396 and application data 1398 and include a processor 1390 (e.g., similar to processor 1310, GPU 1342, and/or NPU 1344 of computing device 1302) for execution of application programs 1396. In some embodiments, multiple processors 1390 are present for execution of application programs 1396 and/or for other purposes. In further examples, computing device 1302 is configured to synchronize copies of application programs 1314 and/or application data 1316 for backup storage at on-premises servers 1392 as application programs 1396 and/or application data 1398.

Embodiments described herein may be implemented in one or more of computing device 1302, network-based server infrastructure 1370, and on-premises servers 1392. For example, in some embodiments, computing device 1302 is used to implement systems, clients, or devices, or components/subcomponents thereof, disclosed elsewhere herein. In other embodiments, a combination of computing device 1302, network-based server infrastructure 1370, and/or on-premises servers 1392 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1320. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1314) are stored in storage 1320. Such computer programs can also be received via wired interface(s) 1360 and/or wireless modem(s) 1360 over network 1304. Such computer programs, when executed or loaded by an application, enable computing device 1302 to implement features of embodiments discussed herein. Accordingly, such computer programs represent controllers of the computing device 1302.

Embodiments are also directed to computer program products comprising computer code or instructions stored on any computer-readable medium or computer-readable storage medium. Such computer program products include the physical storage of storage 1320 as well as further physical storage types.

V. Additional Exemplary Embodiments

A software development prioritization system comprising a processor circuit and a memory device is described herein. The memory device stores program code executable by the processor circuit to: receive a first model feature and a second model feature determined based on analysis of user behavior with respect to a software application; determine data associated with the first and second model features; utilize a large language model (LLM) to generate, based on the determined data, a first feature summary for the first model feature and a second feature summary for the second model feature; determine, based on the first and second feature summaries, a similarity between a first software development item and the first model feature, a second software development item and the first model feature, the first software development item and the second model feature, and the second software development item and the second model feature; and prioritize the first software development item based on the determined similarities.

In an implementation of the foregoing system, the program code is further executable by the processor circuit to: perform a first software development task corresponding to the first software development item prior to a second software development task corresponding to the second software development item.

In an implementation of the foregoing system, to receive the first and second model features, the program code is executable by the processor circuit to: receive a set of model features from a machine learning (ML) model trained to predict user behavior; and select the first and second model features from the set of model features based on selection criteria.

In an implementation of the foregoing system, each model feature of the set of model features is assigned a feature importance indicating a level of influence the model feature has over the predicted user behavior; and a feature importance of the first model feature and a feature importance of the second model feature satisfy the selection criteria.

In an implementation of the foregoing system, the ML model is trained to predict user retention with respect to the software application.

In an implementation of the foregoing system, to determine the similarities, the program code is executable by the processor circuit to: provide the first and second software development items and the first and second model features to an embedding model; receive, from the embedding model, development item embeddings describing a context of the first and second software development items and feature embeddings describing a context of the first and second model features; and determine similarities between the development item embeddings and the feature embeddings.

In an implementation of the foregoing system, the program code is executable by the processor circuit to further: generate an affinity matrix comprising a first grouping of data corresponding to the first software development item, a second grouping of data corresponding to the second software development item, a third grouping of data corresponding to the first model feature, and a fourth grouping of data corresponding to the second model feature, and wherein values in the affinity matrix comprise a score representing a respective similarity of the determined similarities.

In an implementation of the foregoing system, to prioritize the first software development item, the program code is executable by the processor circuit to: perform singular value decomposition on the affinity matrix to determine a first singular value and a second singular value, the first singular value having a corresponding first singular vector comprising a linear combination of importance of the first and second software development items to the first singular vector; and prioritize the first software development item based on the first and second singular values.

In an implementation of the foregoing system, the second singular value has a corresponding second singular vector comprising a linear combination of importance of the first and second software development items to the second singular vector, and to prioritize the first software development item based on the first and second singular values, the program code is executable by the processor circuit to: transform coefficients of the first and second singular vectors; determine a prioritization score for the first software development item based on a first component of the first singular vector corresponding to the first software development item and a second component of the second singular vector corresponding to the first software development item, the first component comprising a coefficient of the first singular vector corresponding to the first software development item and the second component comprising a coefficient of the second singular vector corresponding to the first software development item; and prioritize the first software development item based on the prioritization score.

In an implementation of the foregoing system, to transform the coefficients, the program code is executable by the processor circuit to: apply an absolute value transformation to the coefficients; or apply a squaring transformation to the coefficients.

In an implementation of the foregoing system, to transform the coefficients, the program code is executable by the processor circuit to: apply a scale transformation to the coefficients based on a measure of importance the corresponding singular value has in varying the determined similarities.

In an implementation of the foregoing system, the program code is executable by the processor circuit to receive a third model feature determined based on analysis of user behavior with respect to a hardware device.

In an implementation of the foregoing system, the hardware device is configured to execute the software application.

A method for prioritizing software development is described herein. The method comprises: receiving a first model feature and a second model feature determined based on analysis of user behavior with respect to a software application; determining data associated with the first and second model features; utilizing a large language model (LLM) to generate, based on the determined data, a first feature summary for the first model feature and a second feature summary for the second model feature; determining, based on the first and second feature summaries, a similarity between a first software development item and the first model feature, a second software development item and the first model feature, the first software development item and the second model feature, and the second software development item and the second model feature; and prioritizing the first software development item based on the determined similarities.

In an implementation of the foregoing method, the method further comprises: performing a first software development task corresponding to the first software development item prior to a second software development task corresponding to the second software development item.

In an implementation of the foregoing method, said receiving the first and second model features comprises: receiving a set of model features from a machine learning (ML) model trained to predict user behavior; and selecting the first and second model features from the set of model features based on selection criteria.

In an implementation of the foregoing method, each model feature of the set of model features is assigned a feature importance indicating a level of influence the model feature has over the predicted user behavior; and a feature importance of the first model feature and a feature importance of the second model feature satisfy the selection criteria.

In an implementation of the foregoing method, the ML model is trained to predict user retention with respect to the software application.

In an implementation of the foregoing method, said determining the similarities comprises: providing the first and second software development items and the first and second model features to an embedding model; receiving, from the embedding model, development item embeddings describing a context of the first and second software development items and feature embeddings describing a context of the first and second model features; and determining similarities between the development item embeddings and the feature embeddings.

In an implementation of the foregoing method, the method further comprises: generating an affinity matrix comprising a first grouping of data corresponding to the first software development item, a second grouping of data corresponding to the second software development item, a third grouping of data corresponding to the first model feature, and a fourth grouping of data corresponding to the second model feature, and wherein values in the affinity matrix comprise a score representing a respective similarity of the determined similarities.

In an implementation of the foregoing method, said prioritizing the first software development item comprises: performing singular value decomposition on the affinity matrix to determine a first singular value and a second singular value, the first singular value having a corresponding first singular vector comprising a linear combination of importance of the first and second software development items to the first singular vector; and prioritizing the first software development item based on the first and second singular values.

In an implementation of the foregoing method, the second singular value has a corresponding second singular vector comprising a linear combination of importance of the first and second software development items to the second singular vector, and said prioritizing the first software development item based on the first and second singular values comprises: transforming coefficients of the first and second singular vectors; determining a prioritization score for the first software development item based on a first component of the first singular vector corresponding to the first software development item and a second component of the second singular vector corresponding to the first software development item, the first component comprising a coefficient of the first singular vector corresponding to the first software development item and the second component comprising a coefficient of the second singular vector corresponding to the first software development item; and prioritizing the first software development item based on the prioritization score.

In an implementation of the foregoing method, said transforming the coefficients comprises: applying an absolute value transformation to the coefficients; or applying a squaring transformation to the coefficients.

In an implementation of the foregoing method, said transforming the coefficients comprises applying a scale transformation to the coefficients based on a measure of importance the corresponding singular value has in varying the determined similarities.

In an implementation of the foregoing method, the method further comprises receiving a third model feature determined based on analysis of user behavior with respect to a hardware device.

In an implementation of the foregoing method, the hardware device is configured to execute the software application.

A computer-readable storage medium is described herein. The computer-readable storage medium encoded with program instructions structured to cause a processor to perform any of the foregoing methods.

A method for prioritizing hardware device development is described herein. The method for prioritizing hardware device development comprises: receiving first and second model features determined based on analysis of user behavior with respect to a hardware device; determining data associated with the first and second model features; utilizing an LLM to generate, based on the determined data, a first feature summary for the first model feature and a second feature summary for the second model feature; determining, based on the first and second feature summaries, a similarity between a first hardware development item and the first model feature, a second hardware development item and the first model feature, the first hardware development item and the second model feature, and the second hardware development item and the second model feature; and prioritize the first hardware development item based on the determined similarities.

In an implementation of the foregoing method for prioritizing hardware device development, the method further comprises: performing a first hardware development task corresponding to the first hardware development item prior to a second hardware development task corresponding to the second hardware development item.

In an implementation of the foregoing method for prioritizing hardware device development, the first hardware development task corresponds to developing a new version of the hardware device, a hardware update to the hardware device, a component of the hardware device, a peripheral device usable by the hardware device, or an expansion card for the hardware device.

In an implementation of the foregoing method for prioritizing hardware device development, said receiving the first and second model features comprises: receiving a set of model features from a machine learning (ML) model trained to predict user behavior; and selecting the first and second model features from the set of model features based on selection criteria.

In an implementation of the foregoing method for prioritizing hardware device development, each model feature of the set of model features is assigned a feature importance indicating a level of influence the model feature has over the predicted user behavior; and a feature importance of the first model feature and a feature importance of the second model feature satisfy the selection criteria.

In an implementation of the foregoing method for prioritizing hardware device development, the ML model is trained to predict user retention with respect to the hardware device.

In an implementation of the foregoing method for prioritizing hardware device development, said determining the similarities comprises: providing the first and second software development items and the first and second model features to an embedding model; receiving, from the embedding model, development item embeddings describing a context of the first and second hardware development items and feature embeddings describing a context of the first and second model features; and determining similarities between the development item embeddings and the feature embeddings.

In an implementation of the foregoing method for prioritizing hardware device development, the method further comprises: generating an affinity matrix comprising a first grouping of data corresponding to the first hardware development item, a second grouping of data corresponding to the second hardware development item, a third grouping of data corresponding to the first model feature, and a fourth grouping of data corresponding to the second model feature, and wherein values in the affinity matrix comprise a score representing a respective similarity of the determined similarities.

In an implementation of the foregoing method for prioritizing hardware device development, said prioritizing the first hardware development item comprises: performing singular value decomposition on the affinity matrix to determine a first singular value and a second singular value, the first singular value having a corresponding first singular vector comprising a linear combination of importance of the first and second hardware development items to the first singular vector; and prioritizing the first hardware development item based on the first and second singular values.

In an implementation of the foregoing method for prioritizing hardware device development, the second singular value has a corresponding second singular vector comprising a linear combination of importance of the first and second hardware development items to the second singular vector, and said prioritizing the first hardware development item based on the first and second singular values comprises: transforming coefficients of the first and second singular vectors; determining a prioritization score for the first hardware development item based on a first component of the first singular vector corresponding to the first hardware development item and a second component of the second singular vector corresponding to the first hardware development item, the first component comprising a coefficient of the first singular vector corresponding to the first hardware development item and the second component comprising a coefficient of the second singular vector corresponding to the first hardware development item; and prioritizing the first hardware development item based on the prioritization score.

In an implementation of the foregoing method for prioritizing hardware device development, said transforming the coefficients comprises: applying an absolute value transformation to the coefficients; or applying a squaring transformation to the coefficients.

In an implementation of the foregoing method for prioritizing hardware device development, said transforming the coefficients comprises applying a scale transformation to the coefficients based on a measure of importance the corresponding singular value has in varying the determined similarities.

In an implementation of the foregoing method for prioritizing hardware device development, the method further comprises receiving a third model feature determined based on analysis of user behavior with respect to a software application executable by the hardware device, stored by the hardware device, or related to the operation of the hardware device.

A hardware development prioritization system is described herein. The hardware device prioritization system comprises a processor circuit and a memory device. The memory device comprises program code structured to cause the processor circuit to perform any of the forgoing methods for prioritizing hardware device development.

A computer-readable storage medium related to hardware prioritization is described herein. The computer-readable storage medium comprises program code structured to cause a processor to perform any of the forgoing methods for prioritizing hardware device development.

A hardware and software development prioritization system is described herein. The hardware and software development prioritization system comprises a processor circuit and a memory device. The memory device comprises program code structured to cause the processor circuit to perform any of the forgoing methods for prioritizing software development and/or prioritizing hardware device development.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Further still, example embodiments have been described with respect to LLMs; however, it is also contemplated herein that embodiments may utilize other types of generative AI models (e.g., a generative adversarial network (GAN), a multimodal model, and/or the like). For instance, an implementation of the described systems and/or methods may leverage a multimodal model that inputs and/or outputs more than one modality (e.g., text and images).

Further still, example embodiments have been described with respect to utilizing singular value decomposition to prioritize development items; however, embodiments described herein may utilize other techniques for rank factorization of an affinity matrix to determine which development items to prioritize.

Moreover, according to the described embodiments and techniques, any components of systems, computing devices, servers, applications, embedding models, generative AI models, SRI systems, search engine systems, knowledge services, and/or their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

40

What is claimed is:

1. A software development prioritization system, comprising:
a processor circuit; and
a memory device that stores program code executable by the processor circuit to:
receive a set of model features from a machine learning (ML) model trained to predict user behavior with respect to a software application;
select a first model feature and a second model feature from the set of model features based on selection criteria, the first and second model features assigned respective feature importance scores indicating a level of influence the corresponding model feature has over predicted user behavior, the feature importance scores satisfying the selection criteria;
determine data associated with the first and second model features;
utilize a large language model (LLM) to generate, based on the determined data, a first feature summary for the first model feature and a second feature summary for the second model feature;
determine, based on the first and second feature summaries, a similarity between a first software development item and the first model feature, a second software development item and the first model feature, the first software development item and the second model feature, and the second software development item and the second model feature;
prioritize the first software development item based on the determined similarities; and
perform a software development task corresponding to the first software development item prior to a second software development task corresponding to the second software development item.

2. The software development prioritization system of claim 1, wherein the ML model is trained to predict user retention with respect to the software application.

3. The software development prioritization system of claim 1, wherein to determine the similarities, the program code is executable by the processor circuit to:
provide the first and second software development items and the first and second model features to an embedding model;
receive, from the embedding model, development item embeddings describing a context of the first and second software development items and feature embeddings describing a context of the first and second model features; and
determine similarities between the development item embeddings and the feature embeddings.

4. The software development prioritization system of claim 1, the program code is executable by the processor circuit to further:
generate an affinity matrix comprising a first grouping of data corresponding to the first software development item, a second grouping of data corresponding to the second software development item, a third grouping of data corresponding to the first model feature, and a fourth grouping of data corresponding to the second model feature, and
wherein values in the affinity matrix comprise a score representing a respective similarity of the determined similarities.

5. The software development prioritization system of claim 4, wherein to prioritize the first software development item, the program code is executable by the processor circuit to:

perform singular value decomposition on the affinity matrix to determine a first singular value and a second singular value, the first singular value having a corresponding first singular vector comprising a linear combination of importance of the first and second software development items to the first singular vector; and prioritize the first software development item based on the first and second singular values.

6. The software development prioritization system of claim 5, wherein the second singular value has a corresponding second singular vector comprising a linear combination of importance of the first and second software development items to the second singular vector, and to prioritize the first software development item based on the first and second singular values, the program code is executable by the processor circuit to:

transform coefficients of the first and second singular vectors;

determine a prioritization score for the first software development item based on a first component of the first singular vector corresponding to the first software development item and a second component of the second singular vector corresponding to the first software development item, the first component comprising a coefficient of the first singular vector corresponding to the first software development item and the second component comprising a coefficient of the second singular vector corresponding to the first software development item; and prioritize the first software development item based on the prioritization score.

7. The software development prioritization system of claim 6, wherein to transform the coefficients, the program code is executable by the processor circuit to:

apply an absolute value transformation to the coefficients; or apply a squaring transformation to the coefficients.

8. The software development prioritization system of claim 6, wherein to transform the coefficients, the program code is executable by the processor circuit to:

apply a scale transformation to the coefficients based on a measure of importance the corresponding singular value has in varying the determined similarities.

9. A method for software development prioritization comprising:

receiving a first model feature and a second model feature determined based on analysis of user behavior with respect to a software application;

determining data associated with the first and second model features;

utilizing a large language model (LLM) to generate, based on the determined data, a first feature summary for the first model feature and a second feature summary for the second model feature;

determining, based on the first and second feature summaries, a similarity between a first software development item and the first model feature, a second software development item and the first model feature, the first software development item and the second model feature, and the second software development item and the second model feature;

prioritizing the first software development item based on the determined similarities; and performing a first software development task corresponding to the first software development item prior to a second software development task corresponding to the second software development item.

10. The method of claim 9, wherein said receiving the first and second model features further comprises:

receiving a set of model features from a machine learning (ML) model trained to predict user behavior; and selecting the first and second model features from the set of model features based on selection criteria.

11. The method of claim 10, wherein:

each model feature of the set of model features is assigned a feature importance indicating a level of influence the model feature has over the predicted user behavior; and a feature importance of the first model feature and a feature importance of the second model feature satisfy the selection criteria.

12. The method of claim 9, further comprising:

generating an affinity matrix comprising a first grouping of data corresponding to the first software development item, a second grouping of data corresponding to the second software development item, a third grouping of data corresponding to the first model feature, and a fourth grouping of data corresponding to the second model feature, and wherein values in the affinity matrix comprise a score representing a respective similarity of the determined similarities.

13. The method of claim 12, wherein said prioritizing the first software development item comprises:

performing singular value decomposition on the affinity matrix to determine a first singular value and a second singular value, the first singular value having a corresponding first singular vector comprising a linear combination of importance of the first and second software development items to the first singular vector; and prioritizing the first software development item based on the first and second singular values.

14. The method of claim 13, wherein the second singular value has a corresponding second singular vector comprising a linear combination of importance of the first and second software development items to the second singular vector, and said prioritizing the first software development item based on the first and second singular values comprises:

transforming coefficients of the first and second singular vectors;

determining a prioritization score for the first software development item based on a first component of the first singular vector corresponding to the first software development item and a second component of the second singular vector corresponding to the first software development item, the first component comprising a coefficient of the first singular vector corresponding to the first software development item and the second component comprising a coefficient of the second singular vector corresponding to the first software development item; and prioritizing the first software development item based on the prioritization score.

15. The method of claim 14, wherein said transforming the coefficients comprises:

applying an absolute value transformation to the coefficients;

applying a squaring transformation to the coefficients; or applying a scale transformation to the coefficients based on a measure of importance the corresponding singular value has in varying the determined similarities.

16. A computer readable storage medium encoded with program instructions structured to cause a processor to perform a method for prioritizing software development, the method comprising:

receiving a first model feature and a second model feature determined based on analysis of user behavior with respect to a software application;

determining data associated with the first and second model features;

utilizing a large language model (LLM) to generate, based on the determined data, a first feature summary for the first model feature and a second feature summary for the second model feature;

determining, based on the first and second feature summaries, a similarity between a first software development item and the first model feature, a second software development item and the first model feature, the first software development item and the second model feature, and the second software development item and the second model feature;

prioritizing the first software development item based on the determined similarities; and performing a first software development task corresponding to the first software development item prior to a second software development task corresponding to the second software development item.

17. The computer readable storage medium of claim 16, wherein method further comprises:

generating an affinity matrix comprising a first grouping of data corresponding to the first software development item, a second grouping of data corresponding to the second software development item, a third grouping of data corresponding to the first model feature, and a fourth grouping of data corresponding to the second model feature, and wherein values in the affinity matrix comprise a score representing a respective similarity of the determined similarities;

performing singular value decomposition on the affinity matrix to determine a first singular value and a second singular value, the first singular value having a corresponding first singular vector comprising a linear combination of importance of the first and second software development items to the first singular vector; and prioritizing the first software development item based on the first and second singular values.

18. The computer readable storage medium of claim 17, wherein the second singular value has a corresponding second singular vector comprising a linear combination of importance of the first and second software development items to the second singular vector, and said prioritizing the first software development item based on the first and second singular values comprises:

transforming coefficients of the first and second singular vectors;

determining a prioritization score for the first software development item based on a first component of the first singular vector corresponding to the first software development item and a second component of the second singular vector corresponding to the first software development item, the first component comprising a coefficient of the first singular vector corresponding to the first software development item and the second component comprising a coefficient of the second singular vector corresponding to the first software development item; and prioritizing the first software development item based on the prioritization score.

19. The computer readable storage medium of claim 18, wherein said transforming the coefficients comprises:

applying an absolute value transformation to the coefficients;

applying a squaring transformation to the coefficients; or applying a scale transformation to the coefficients based on a measure of importance the corresponding singular value has in varying the determined similarities.

20. The method of claim 16, wherein said receiving the first and second model features further comprises:

receiving a set of model features from a machine learning (ML) model trained to predict user behavior; and selecting the first and second model features from the set of model features based on selection criteria.

* * * * *